(12) United States Patent  
Safont-Sempere et al.

(10) Patent No.: US 9,005,311 B2
(45) Date of Patent: Apr. 14, 2015

(54) ELECTRODE ACTIVE SURFACE PRETREATMENT

(71) Applicant: Sion Power Corporation, Tucson, AZ (US)

(72) Inventors: Marina Safont-Sempere, Ludwigshafen (DE); Chariclea Scordilis-Kelley, Tucson, AZ (US)

(73) Assignee: Sion Power Corporation, Tucson, AZ (US)

( * ) Notice: Subject to any disclaimer, the term of this patent is extended or adjusted under 35 U.S.C. 154(b) by 0 days.

(21) Appl. No.: 14/069,698

(22) Filed: Nov. 1, 2013

(65) Prior Publication Data

US 2014/0123477 A1 May 8, 2014

Related U.S. Application Data

(60) Provisional application No. 61/721,978, filed on Nov. 2, 2012.

(51) Int. Cl.
| | |
|---|---|
| *H01M 4/13* | (2010.01) |
| *H01M 4/139* | (2010.01) |
| *H01M 6/50* | (2006.01) |
| *H01M 4/04* | (2006.01) |
| *H01M 4/1395* | (2010.01) |
| *H01M 10/44* | (2006.01) |

(52) U.S. Cl.
CPC ............ *H01M 4/139* (2013.01); *H01M 6/5088* (2013.01); *H01M 4/0447* (2013.01); *H01M 4/1395* (2013.01); *H01M 10/44* (2013.01); *Y02E 60/122* (2013.01)

(58) Field of Classification Search
CPC ................. H01M 4/13–4/1399; H01M 6/5055
See application file for complete search history.

(56) References Cited

U.S. PATENT DOCUMENTS

| | | |
|---|---|---|
| 3,960,600 A | 6/1976 | Chodosh |
| 4,664,991 A | 5/1987 | Perichaud et al. |
| 4,739,018 A | 4/1988 | Armand et al. |
| 4,833,048 A | 5/1989 | Dejonghe et al. |
| 4,917,974 A | 4/1990 | Dejonghe et al. |
| 4,954,371 A | 9/1990 | Yializis |
| 5,162,175 A | 11/1992 | Visco et al. |
| 5,194,341 A | 3/1993 | Bagley et al. |

(Continued)

FOREIGN PATENT DOCUMENTS

| | | |
|---|---|---|
| CN | 1415124 A | 4/2003 |
| JP | 63-126156 | 5/1988 |

(Continued)

OTHER PUBLICATIONS

International Search Report and Written Opinion for Application No. PCT/US2013/068011 mailed Feb. 10, 2014.

(Continued)

*Primary Examiner* — Ula C. Ruddock
*Assistant Examiner* — Scott J Chmielecki
(74) *Attorney, Agent, or Firm* — Wolf, Greenfield & Sacks, P.C.

(57) ABSTRACT

Electrode structures and methods of formation are provided. The formation process may include an initial high rate discharge to precondition the electrode active surface. The resulting electroactive surface may have reduced pitting and defects resulting in more uniform utilization of the electrode during subsequent cycling.

24 Claims, 7 Drawing Sheets

(56) References Cited

U.S. PATENT DOCUMENTS

| | | |
|---|---|---|
| 5,314,765 A | 5/1994 | Bates et al. |
| 5,324,599 A | 6/1994 | Oyama et al. |
| 5,366,829 A | 11/1994 | Saidi |
| 5,387,479 A | 2/1995 | Koksbang |
| 5,415,954 A | 5/1995 | Gauthier |
| 5,434,021 A | 7/1995 | Fauteux et al. |
| 5,441,831 A | 8/1995 | Okamoto et al. |
| 5,460,905 A | 10/1995 | Skotheim |
| 5,462,566 A | 10/1995 | Skotheim |
| 5,487,959 A | 1/1996 | Koksbang et al. |
| 5,516,598 A | 5/1996 | Visco et al. |
| 5,529,860 A | 6/1996 | Skotheim et al. |
| 5,538,812 A | 7/1996 | Lee et al. |
| 5,569,520 A | 10/1996 | Bates |
| 5,601,947 A | 2/1997 | Skotheim et al. |
| 5,648,187 A | 7/1997 | Skotheim et al. |
| 5,681,615 A | 10/1997 | Affinito et al. |
| 5,690,702 A | 11/1997 | Skotheim et al. |
| 5,698,339 A | 12/1997 | Kawakami et al. |
| 5,716,736 A | 2/1998 | Zhang et al. |
| 5,723,230 A | 3/1998 | Naoi et al. |
| 5,731,104 A | 3/1998 | Ventura et al. |
| 5,783,330 A | 7/1998 | Naoi et al. |
| 5,792,575 A | 8/1998 | Naoi et al. |
| 5,824,434 A | 10/1998 | Kawakami et al. |
| 5,834,137 A | 11/1998 | Zhang et al. |
| 5,882,819 A | 3/1999 | Naoi et al. |
| 5,961,672 A | 10/1999 | Skotheim et al. |
| 6,025,094 A | 2/2000 | Visco et al. |
| 6,066,417 A | 5/2000 | Cho et al. |
| 6,117,590 A | 9/2000 | Skotheim et al. |
| 6,153,337 A | 11/2000 | Carlson et al. |
| 6,156,395 A | 12/2000 | Zhang et al. |
| 6,183,901 B1 | 2/2001 | Ying et al. |
| 6,201,100 B1 | 3/2001 | Gorkovenko et al. |
| 6,202,591 B1 | 3/2001 | Witzman et al. |
| 6,203,947 B1 | 3/2001 | Peled et al. |
| 6,225,002 B1 | 5/2001 | Nimon et al. |
| 6,268,695 B1 | 7/2001 | Affinito |
| 6,276,355 B1 | 8/2001 | Zhang et al. |
| 6,277,514 B1 | 8/2001 | Ying et al. |
| 6,284,412 B1 | 9/2001 | Minakata et al. |
| 6,328,770 B1 | 12/2001 | Gozdz |
| 6,395,423 B1 | 5/2002 | Kawakami et al. |
| 6,413,645 B1 | 7/2002 | Chu et al. |
| 6,508,921 B1 | 1/2003 | Mu et al. |
| 6,517,968 B2 | 2/2003 | Johnson et al. |
| 6,570,325 B2 | 5/2003 | Graff et al. |
| 6,770,187 B1 | 8/2004 | Putter et al. |
| 6,835,493 B2 | 12/2004 | Zhang et al. |
| 6,849,702 B2 | 2/2005 | Callahan et al. |
| 6,852,139 B2 | 2/2005 | Zhang et al. |
| 6,886,240 B2 | 5/2005 | Zhang et al. |
| 7,204,862 B1 | 4/2007 | Zhang et al. |
| 7,247,408 B2 | 7/2007 | Skotheim et al. |
| 7,553,590 B2 | 6/2009 | Mikhaylik |
| 7,785,730 B2 | 8/2010 | Affinito et al. |
| 7,939,199 B1 * | 5/2011 | Gan et al. ............... 429/219 |
| 8,105,717 B2 | 1/2012 | Skotheim et al. |
| 8,197,971 B2 | 6/2012 | Skotheim et al. |
| 8,415,054 B2 | 4/2013 | Skotheim et al. |
| 8,603,680 B2 | 12/2013 | Affinito et al. |
| 8,623,557 B2 | 1/2014 | Skotheim et al. |
| 8,728,661 B2 | 5/2014 | Skotheim et al. |
| 8,753,771 B2 | 6/2014 | Skotheim et al. |
| 2001/0041294 A1 | 11/2001 | Chu et al. |
| 2002/0034688 A1 | 3/2002 | Chu et al. |
| 2002/0071989 A1 | 6/2002 | Verma |
| 2003/0224234 A1 | 12/2003 | Steele et al. |
| 2004/0175621 A1 | 9/2004 | Iriyama et al. |
| 2004/0197641 A1 | 10/2004 | Visco et al. |
| 2005/0051763 A1 | 3/2005 | Affinito et al. |
| 2005/0089757 A1 | 4/2005 | Bannai et al. |
| 2005/0100793 A1 | 5/2005 | Jonghe et al. |
| 2005/0186469 A1 | 8/2005 | De Jonghe et al. |
| 2005/0208353 A1 | 9/2005 | Johnson |
| 2006/0222954 A1 | 10/2006 | Skotheim |
| 2007/0117007 A1 | 5/2007 | Visco et al. |
| 2007/0172739 A1 | 7/2007 | Visco |
| 2007/0212583 A1 | 9/2007 | Johnson |
| 2007/0221265 A1 | 9/2007 | Affinito et al. |
| 2007/0231680 A1 * | 10/2007 | Satoh et al. ............... 429/122 |
| 2008/0014501 A1 | 1/2008 | Skotheim et al. |
| 2008/0057397 A1 | 3/2008 | Skotheim et al. |
| 2008/0070087 A1 | 3/2008 | Johnson |
| 2008/0213672 A1 | 9/2008 | Skotheim et al. |
| 2009/0274849 A1 | 11/2009 | Scott et al. |
| 2010/0104948 A1 | 4/2010 | Skotheim et al. |
| 2010/0192362 A1 | 8/2010 | Yoon et al. |
| 2011/0014524 A1 | 1/2011 | Skotheim et al. |
| 2011/0159376 A1 | 6/2011 | Skotheim et al. |
| 2011/0165471 A9 | 7/2011 | Skotheim et al. |
| 2011/0200868 A1 | 8/2011 | Klaassen |
| 2012/0276449 A1 | 11/2012 | Skotheim et al. |
| 2013/0143096 A1 | 6/2013 | Affinito et al. |
| 2013/0280605 A1 | 10/2013 | Affinito et al. |
| 2014/0205912 A1 | 7/2014 | Skotheim et al. |

FOREIGN PATENT DOCUMENTS

| | | |
|---|---|---|
| JP | 4-028172 | 4/1992 |
| JP | 6-030246 | 2/1994 |
| JP | 09-279357 | 10/1997 |
| JP | 2003-077461 A | 3/2003 |
| JP | 2003-515892 A | 5/2003 |
| JP | 2003-217574 A | 7/2003 |
| JP | 2003-303618 A | 10/2003 |
| JP | 2004-087251 A | 3/2004 |
| JP | 2005-174924 A | 6/2005 |
| JP | 2006-503416 A | 1/2006 |
| JP | 2007-513464 A | 5/2007 |
| KR | 2001-0024927 A | 11/2002 |
| WO | WO 97/01870 A1 | 1/1997 |
| WO | WO 97/44840 | 11/1997 |
| WO | WO 99/19931 A1 | 4/1999 |
| WO | WO 99/33125 | 7/1999 |
| WO | WO 99/57770 A1 | 11/1999 |
| WO | WO 01/33651 A1 | 5/2001 |
| WO | WO 01/39302 | 5/2001 |
| WO | WO 01/39303 | 5/2001 |
| WO | WO 01/97304 | 12/2001 |
| WO | WO 02/071989 A1 | 9/2002 |
| WO | WO 03/100888 A1 | 12/2003 |
| WO | WO 2004/036669 A2 | 4/2004 |
| WO | WO 2005/038953 | 4/2005 |
| WO | WO 2007-111901 A2 | 10/2007 |
| WO | WO 2007/111901 | 11/2007 |
| WO | WO 2007/111895 | 12/2007 |
| WO | WO 2014/071160 | 5/2014 |

OTHER PUBLICATIONS

Aurbach et al., A short review of failure mechanisms of lithium metal and lithiated graphite anodes in liquid electrolyte solutions. Solid State Ionics. 2002;148:405-416.

Zinigrad et al., Simulation of galvanostatic growth of polycrystalline Li deposits in rechargeable Li batteries. Electrochimica Acta. 2001;46:1863-1869.

* cited by examiner

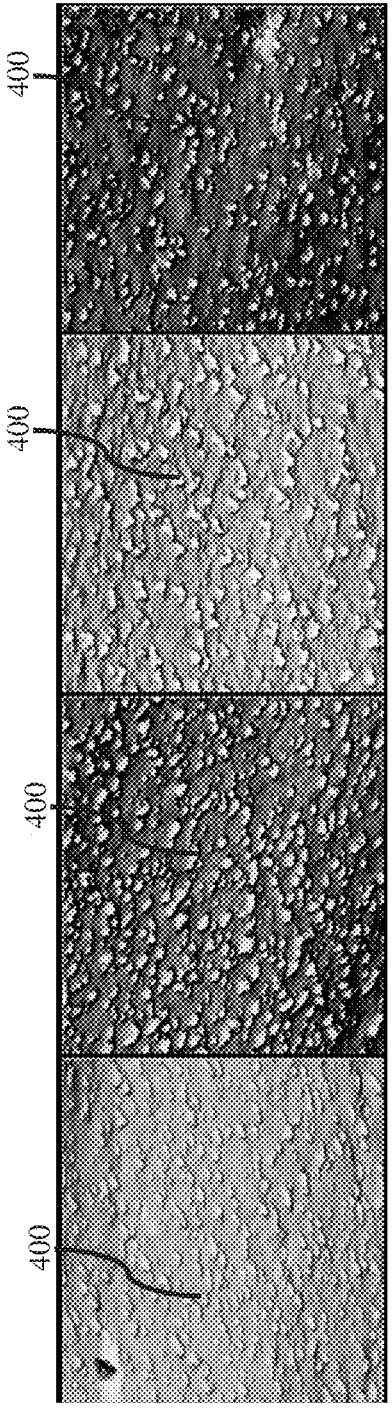
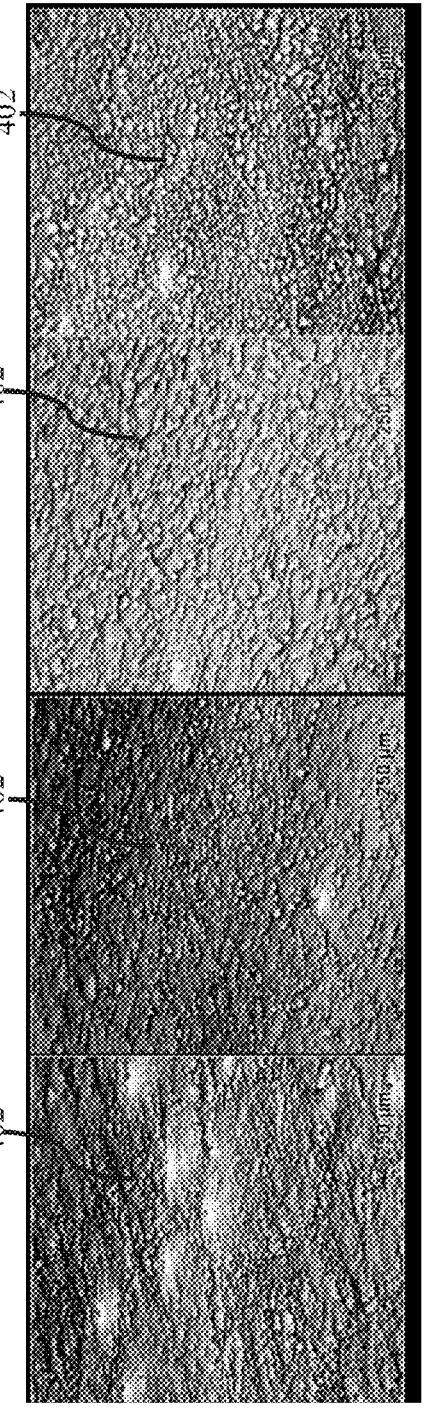

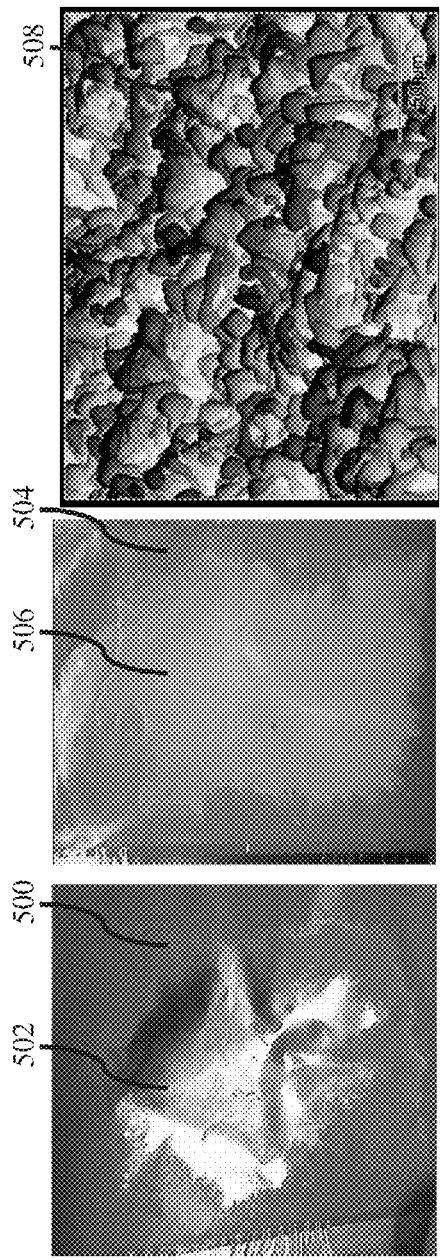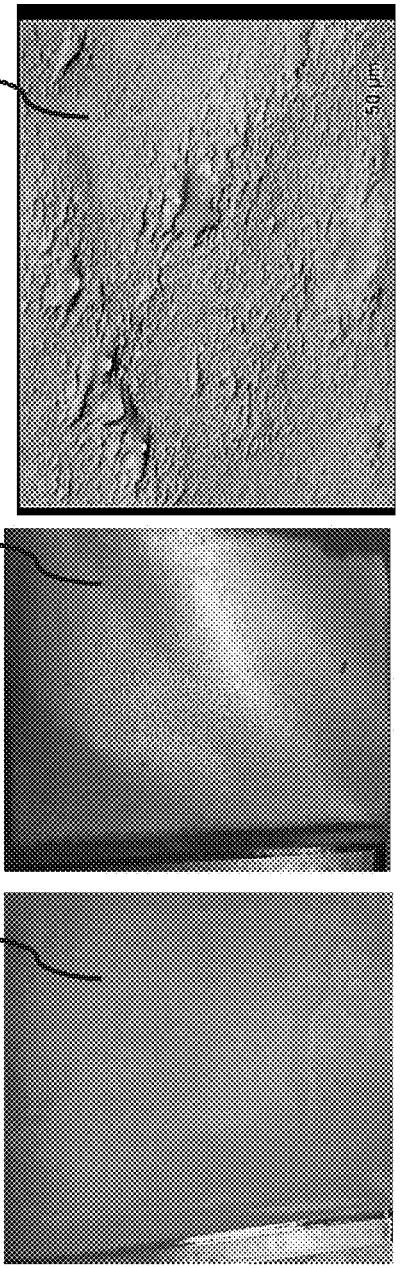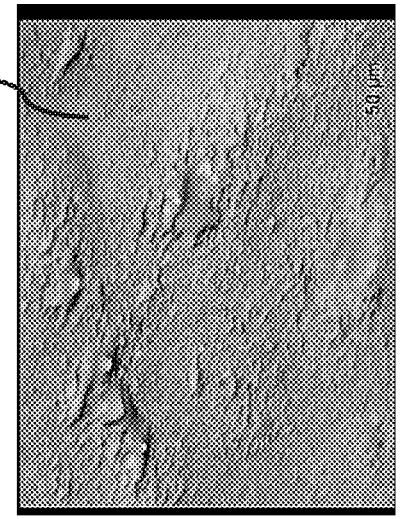

US 9,005,311 B2

ELECTRODE ACTIVE SURFACE PRETREATMENT

RELATED APPLICATIONS

This application claims priority to U.S. Provisional Application No. 61/721,978, filed Nov. 2, 2012, which is incorporated herein by reference in its entirety.

FIELD

The present invention relates to articles and methods for the formation of electrodes for use in electrochemical cells, including those for use in rechargeable lithium batteries.

BACKGROUND

There has been considerable interest in recent years in developing high energy density batteries with lithium containing anodes. Lithium metal is particularly attractive as the anode of electrochemical cells because of its extremely light weight and high energy density as compared, for example, to anodes such as lithium intercalated carbon anodes, where the presence of non-electroactive materials increases weight and volume of the anode and thereby reduces the energy density of the cells, and to other electrochemical systems with, for example, nickel or cadmium electrodes. Lithium metal anodes, or those comprising predominately lithium metal, provide an opportunity to construct cells which are lighter in weight, and which have a higher energy density than cells such as lithium-ion, nickel metal hydride or nickel-cadmium cells. These features are highly desirable for batteries for portable electronic devices such as cellular phones and laptop computers where a premium is paid for low weight. Unfortunately, the reactivity of lithium and the associated cycle life, dendrite formation, electrolyte compatibility, fabrication and safety problems have hindered the commercialization of lithium cells. Accordingly, improvements in the design of electrochemical cells and articles including lithium metal anodes would provide benefits in a variety of fields.

SUMMARY

Electrode structures and methods of formation are provided. The formation process may include an initial high rate discharge to precondition the electrode active surface.

In one embodiment, a method of fabricating an anode includes performing a formation process comprising discharging an anode with a discharge current greater than approximately a 3 C discharge rate.

In another embodiment, a method includes: providing an anode with a first electroactive layer comprising an active electrode species, the first electroactive layer having a first capacity, a second electroactive layer comprising the active electrode species, the second electroactive layer having a second capacity, and an ion conductive protective layer disposed between the first and second electroactive layers; discharging the anode to a depth of discharge corresponding to at least the second capacity, thereby substantially removing the active electrode species from the second electroactive layer during the first discharge; and depositing at least a portion of the active electrode species in the first electroactive layer through the ion conductive layer during at least one charge.

It should be appreciated that the foregoing concepts, and additional concepts discussed below, may be arranged in any suitable combination, as the present disclosure is not limited in this respect.

The foregoing and other aspects, embodiments, and features of the present teachings can be more fully understood from the following description in conjunction with the accompanying drawings.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 8A is a scanning electron microscope image of a lithium anode active surface discharged at 0.4 mA cm$^{-2}$ from an electroactive cell including an XE2 carbon black powder and sulfur-based cathode according to one set of embodiments;

FIG. 8B is a scanning electron microscope image of a lithium anode active surface discharged at 4.6 mA cm$^{-2}$ from an electroactive cell including an XE2 carbon black powder and sulfur-based cathode according to one set of embodiments;

FIG. 9A is a scanning electron microscope image of a lithium anode active surface discharged at 0.4 mA cm$^{-2}$ from an electroactive cell including a plain mesocarbon microbead and sulfur-based cathode according to one set of embodiments;

FIG. 9B is a scanning electron microscope image of a lithium anode active surface discharged at 4.6 mA cm$^{-2}$ from an electroactive cell including a plain mesocarbon microbead and sulfur-based cathode according to one set of embodiments;

FIG. 10A is a scanning electron microscope image of a lithium anode active surface discharged at 0.4 mA cm$^{-2}$ from an electroactive cell including a sintered nickel cathode according to one set of embodiments;

FIG. 10B is a scanning electron microscope image of a lithium anode active surface discharged at 4.6 mA cm$^{-2}$ from an electroactive cell including a sintered nickel cathode according to one set of embodiments;

FIG. 11A is a scanning electron microscope image of a lithium anode active surface discharged at 0.4 mA cm$^{-2}$ from an electroactive cell including a mesocarbon microbead and sulfur-based cathode according to one set of embodiments;

FIG. 11B is a scanning electron microscope image of a lithium anode active surface discharged at 4.6 mA cm$^{-2}$ from an electroactive cell including a mesocarbon microbead and sulfur-based cathode according to one set of embodiments;

FIG. 15A is a photograph of an anode of a lithium-lithium cell pretreated with a 3 C discharge rate without pressure according to one set of embodiments;

FIG. 15B is a photograph of the cathode associated with the anode of FIG. 15A according to one set of embodiments;

FIG. 15C is a scanning electron microscope image of the lithium deposited on the cathode of FIG. 15B according to one set of embodiments;

FIG. 16A is a photograph of an anode of a lithium-lithium cell pretreated with a 3 C discharge rate with pressure according to one set of embodiments;

FIG. 16B is a photograph of the cathode associated with the anode of FIG. 16A according to one set of embodiments; and FIG. 16C is a scanning electron microscope image of the lithium deposited on the cathode of FIG. 16B according to one set of embodiments.

DETAILED DESCRIPTION

Electrode structures and methods of formation are provided. The formation process may include an initial high rate discharge to precondition the electrode active surface. The resulting electroactive surface may have reduced pitting and defects resulting in more uniform utilization of the electrode turned subsequent cycling.

Figure 1A:
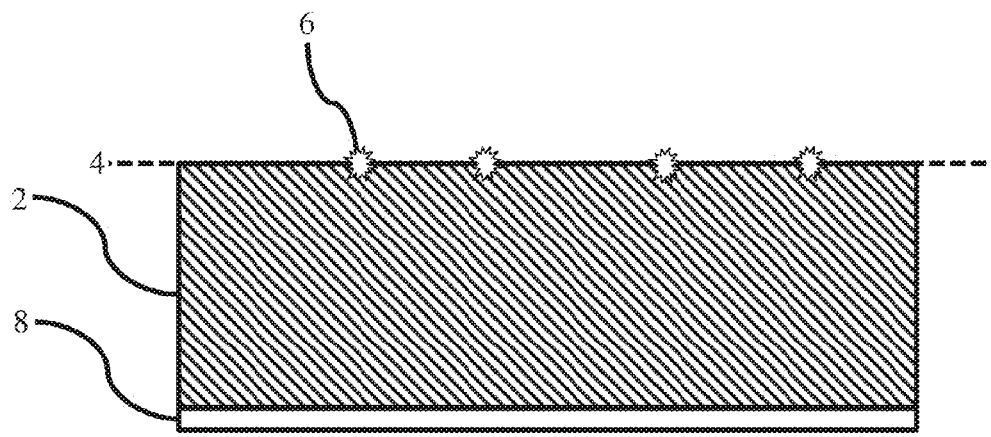
FIG. 1A is a schematic representation of an electrode with defects present on the active surface according to one set of embodiments.
Figure 1B:
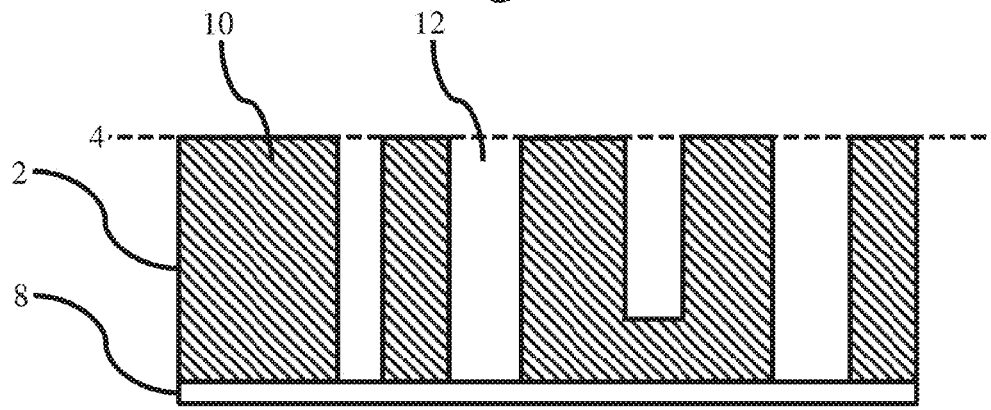
FIG. 1B is the electrode of FIG. 1A after a low C rate discharge without pretreatment according to one set of embodiments.

The inventors have recognized that inhomogeneous utilization of an electrode during discharge at standard rates of stripping, and even more so at slow rates, leads to decreased cell performance and cycle life. Referring to FIGS. 1A and 1B, an exemplary electrode is depicted wherein inhomogeneous utilization of an anode 2, such as a lithium metallic anode, occurs. The inhomogeneous utilization may occur due to surface pitting of the active surface 4 at surface defects 6, e.g., triple points and other high diffusion rate locations along the active surface as would be appreciated by one of ordinary skill in the art. As shown illustratively in the figures, the resulting pitting during discharge generally occurs at the locations corresponding to the depicted surface defects. As the striping progresses during the first discharge, pits 12 become deeper, instead of wider, so in the end only a fraction of the anode surface has participated in the first discharge, leaving some areas of electroactive material 10 pristine and others over-utilized. In some embodiments, pits 12 may extend the entire thickness of the anode to the under-laying substrate 8 (see FIGS. 1A and 1B). While pits may extend the entire thickness of the anode, as illustrated in FIG. 1B, in other embodiments, some or substantially all of the resulting pits may extend across only a portion of the anode thickness (and not the entire thickness). The extent of pitting may depend on factors such as the depth of discharge.

Without wishing to be bound by theory, during subsequent charging, the lithium preferentially redeposits along the periphery of the pits resulting in mossy lithium. Deposition of mossy lithium is undesirable because it is more reactive due to it having a high surface area. Additionally or alternatively, the lithium may also redeposit as lithium dendrites around the pits leading to possible safety hazards due to cell shorting as well as accelerated capacity fade due to dendrites breaking off and forming portions of dead lithium. Consequently, formation of these initial pits may result in subsequent cycling creating undesirable mossy lithium and dendrites. In addition to the creation of mossy lithium and dendrites noted above, inhomogeneous utilization of the anode may also be detrimental to protective layers formed on the electrode due to due to the uneven changes in the morphology of the resulting active surface during cycling.

As noted above, uneven consumption of anode active material preferentially occurs at defects present along the active surface of the anode. Such defects include, but are not limited to, surface defects, triple points, surface pitting, grain boundaries, and other high rate diffusion paths located on the active surface. In order to improve cell performance and cyclability, the inventors have recognized that it would be beneficial to improve the homogeneous utilization of the electroactive material. More specifically, the inventors have recognized that the electroactive material utilization may be made more uniform by discharging the anode at a relatively high discharge rate during cell formation to pretreat the active surface. The high rate discharge of the anode may comprise any number of different discharge profiles, as will be discussed in more detail below. The currently disclosed formation process may result in the activation, and utilization, of a larger portion of the active surface during both the initial formation process and subsequent cycling of the cell, resulting in a more uniform utilization of the electrode. In some embodiments, to avoid excessive mossy lithium and dendritic growth the high rate discharge is only applied during cell formation and subsequent post formation cycling of the cell is performed at standard cycling rates.

In general, the formation of an electrochemical cell refers to the first discharge, the first discharge/charge cycle, or in some instances the first number of discharge/charge cycles, of an electrochemical cell. Prior to the formation process, the materials within the electrochemical cell are in the as-assembled condition (e.g., interface layers may be unformed, the electroactive species may not be intercalated with an electrode, and/or other initial conditions that are not present in the formed electrochemical cell may be present). That is, the electrochemical cell may not be fully "formed" (i.e., it may be incompletely formed) prior to being subjected to a formation process described herein. After formation, the electrochemical cell has formed the structures (e.g., interfaces) and charge/discharge characteristics desired for use by an end user such that the properties of the cell do not substantially change during usage other than would be expected from typical cell aging and cycling degradation. During the formation process, the electrochemical cell is discharged, and in some embodiments charged, according to predefined charge and discharge profiles to control the electrochemical reactions that occur during formation. For example, the thickness of a solid electrolyte interface in a lithium based electrochemical cell may be controlled by the formation process. As would be understood by one of skill in the art, the charge/discharge profiles used during formation will change according to the particular electrochemical system. While the formation process of many secondary electrochemical cells are generally conducted by the manufacturer, it is also possible that the formation process could be conducted by a product manufacturer and in some instances may even be conducted by a user.

Depending on the particular electrochemical cell, after the formation process is completed subsequent processing steps may also be conducted. For example, lithium based batteries are often subjected to storage and/or aging for a predetermined amount of time after formation. In some instances, cell storage and/or aging may be carried out at a preselected temperature. During the storage and aging process, defective batteries may show excessive self-discharge rates that may be due to any number of possible cell defects. After cell storage and aging, the cells may be subjected to additional acceptance testing prior to shipment to detect the defective batteries. Acceptance testing may include, for example, impedance measurements, voltage measurements, capacity measurements, rate capability measurements, and other applicable performance characteristics. In some instances, some acceptance testing measurements may be conducted on every cell. Alternatively, depending upon the specific performance characteristic being measured, the measurement may be conducted on a lot basis.

Figure 1C:
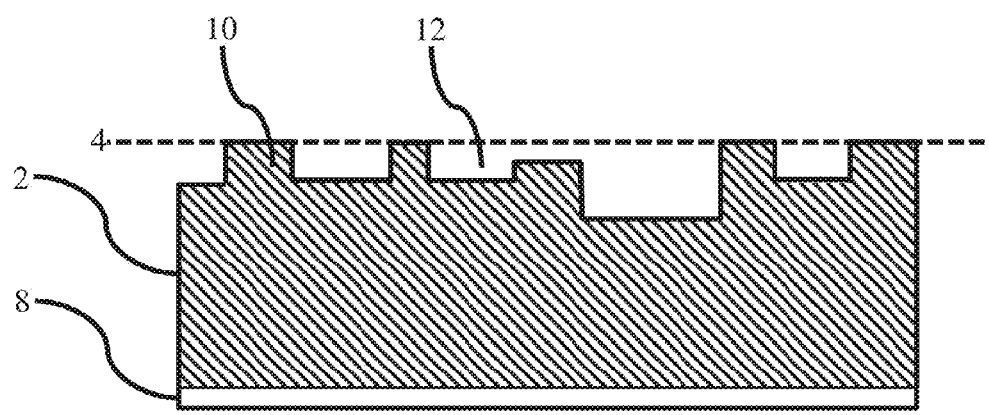
FIG. 1C is the electrode of FIG. 1A after pretreatment according to one set of embodiments.

Turning now to the figures, a schematic representation of an active surface after pretreatment using a formation process described herein is depicted in FIG. 1C. The anode 2 depicted in FIG. 1C corresponds to the same starting anode depicted in FIG. 1A with surface defects 6. However, unlike the anode depicted in FIG. 1B where pits 12 extend deep into the thickness of the anode (e.g., to the underlying substrate 8 from the locations corresponding to surface defects 6), the pretreated anode 2 in FIG. 1C includes shallower pits and in many embodiments, does not contain pits extending all the way to the corresponding substrate 8. Furthermore, a greater portion of the active surface and corresponding bulk electroactive material may be utilized resulting in an active surface containing fewer defects and pitting.

For the sake of clarity, the discussion and examples disclosed herein are directed to a lithium sulfur-based electrochemical cell. However, as would be appreciated by one of ordinary skill in the art, the current disclosure is not limited to any particular electrochemical system. For example, the methods may be applicable to metallic electrodes, including, but not limited to, lithium metal electrodes, silicon-graphite electrodes, semiconductor-graphite electrodes, metallic-graphite electrodes, and other appropriate electrodes. Furthermore, while specific embodiments are described with regards to treatment of active surfaces of an anode, in some embodiments the methods disclosed herein may also be applicable to the pretreatment of the active surfaces of a cathode using high rate charging. For example, these methods may be of benefit for cathodes including amorphous electroactive materials (e.g., sulfur cathodes, such as cathodes including sulfur melted onto a rigid underlying cathode structure) or cathodes with low surface area structures.

Without wishing to be bound by theory, the diffusion rate of electroactive material at defects and other high rate diffusion pathways along the active surface is greater than that of the bulk electroactive material on the active surface (e.g., defect-free portions of the active surface). However, due to the relatively small area associated with these defects as compared to the bulk electroactive material, the ability of material to be preferentially stripped from the surface defects becomes limited as the rate of stripping (i.e., discharge) increases. Therefore, as the rate of stripping from the electroactive material is increased, a greater portion of stripped electroactive material will generally correspond to material stripped from the bulk electroactive material. Consequently, in some embodiments, the discharge rate during formation is selected to be great enough to ensure that the majority of the stripped electroactive material corresponds to material from the bulk electroactive material as opposed to material stripped from the surface defects and any other high rate diffusion pathways. It is believed that due to the increased utilization of electroactive material from the bulk of the anode, as opposed to the surface defects, the resulting pitting of the active surface will be reduced and a larger portion of the active surface will be activated. Consequently, as compared to cell formation performed at lower discharge rates, treatments described herein may result in fewer resulting pits and surface defects present within the active surface to act as preferential diffusion/deposition sites. Therefore, subsequent cycling of the electrochemical cell may also be more uniform.

It should be appreciated that the specific rates and associated electrical potentials applied to the electrochemical cell during formation to ensure appropriate pretreatment of the active surface will vary according to the specific electrochemical chemical system in use. Therefore, the current disclosure should not be viewed as being limited to any particular electrochemical system and instead should be viewed as generally teaching the application of high rate discharge during formation to increase the uniformity of utilization of the active surface of an electrode.

Referring again to FIG. 1, in the current embodiment, anode 2 comprises a base electrode material such as lithium metal, which can serve as the anode active material. The lithium metal may be in the form of, e.g., a lithium metal foil or a thin lithium film that has been deposited on the substrate, as described below. The lithium metal may also be in the form of a lithium alloy such as, for example, a lithium-tin alloy or a lithium aluminum alloy.

In this and other embodiments, the thickness of the anode may vary from, e.g., about 2 to 200 microns. For instance, the anode (e.g., the electroactive layer(s) of the anode) may have a thickness of less than or equal to 200 microns, less than 100 microns, less than 50 microns, less than 25 microns, less than 10 microns, or less than 5 microns. In some embodiments, the anode may have a thickness of greater than or equal to 5 microns, 10 microns, 25 microns, 50 microns, 100 microns, or 200 microns. Combinations of the above-referenced ranges are also possible (e.g., a thickness of greater than 5 microns and less than or equal to 100 microns). Other ranges are also possible. The choice of the thickness may depend on cell design parameters such as the desired amount of excess lithium, cycle life, and the thickness of the cathode electrode. In one embodiment, the thickness of the anode active layer is in the range of about 2 to 100 microns. In another embodiment, the thickness of the anode is in the range of about 5 to 50 microns. In another embodiment, the thickness of the anode is in the range of about 5 to 25 microns. In yet another embodiment, the thickness of the anode is in the range of about 10 to 25 microns.

As noted above, the anodes 2 illustrated in FIGS. 1A-1C may further comprise a substrate 8, as is known in the art, on the surface of the anode opposite the active surface 4. Substrates are useful as a support on which to deposit the anode active material, and may provide additional stability for handling of thin lithium film anodes during cell fabrication. Further, in the case of conductive substrates, a substrate may also function as a current collector useful in efficiently collecting the electrical current generated throughout the anode and in providing an efficient surface for attachment of electrical contacts leading to an external circuit. A wide range of substrates are known in the art of anodes. Suitable substrates include, but are not limited to, those selected from the group consisting of metal foils, polymer films, metallized polymer films, electrically conductive polymer films, polymer films having an electrically conductive coating, electrically conductive polymer films having an electrically conductive metal coating, and polymer films having conductive particles dispersed therein. In some embodiments the substrate may also be selected from non-electrically-conductive materials. The electroactive layer may be deposited on, and/or bonded to, the substrate using any appropriate method as would be appreciated by one of ordinary skill in the art.

Complete dissolution of the pretreated electrode may lead to the loss of the pretreated active surface. This may result in inhomogeneous deposition and utilization of the electrode upon subsequent cycling. Therefore, in some embodiments it is desirable to avoid the complete dissolution of the pretreated electrode during cycling. In one embodiment, dissolution of the precondition electrode is avoided by limiting the capacity of the corresponding electrode. For example, when an anode is pretreated the cell may be cathode limited such that the capacity of the cathode to accept the electroactive species is less than that available from the anode, thereby limiting how much of the anode may be stripped during cycling. Thus, the pretreated active surface of the anode may be preserved by the use of cell design as opposed to control of the cell cycling conditions. Electrochemical cells and other articles having a pretreated anode or cathode as described herein (e.g., an anode/cathode subjected to a formation process described herein) and a corresponding cathode or anode having a limited capacity with respect to the pretreated electrode are also described.

Having described the overall electrode construction and resulting active surface, examples of specific embodiments of discharge profiles for use with the formation process are presented in FIGS. 2A-2F. In some embodiments, the electrochemical cell is discharged using the disclosed discharge profiles to a preselected depth of discharge.

Figure 2A:
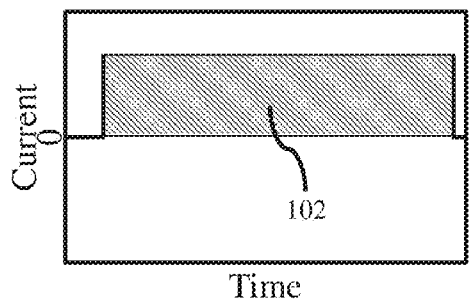
FIG. 2A is a schematic representation of a constant current discharge according to one set of embodiments.

In one embodiment, as depicted in FIG. 2A, the discharge profile used during formation comprises a constant current discharge 102. In this embodiment, a high rate discharge current is applied to the electrochemical cell for the entire pretreatment process. While a substantially constant discharge rate has been depicted, it should be understood that the discharge current could also vary. For example, the discharge current could alternate between different discharge rates as the current disclosure is not limited in this fashion.

Depending on the specific discharge rate selected and the rate capability of the corresponding electrode, in some instances a constant current discharge may result in polarization of the cell. For example, in a lithium metal battery the cell is usually rate limited by the ability of the electroactive species to intercalate with the cathode. Consequently, at higher discharge rates the cathode may be unable to intercalate lithium at the same rate at which it is stripped from the metallic lithium electrode, leading to cell polarization. Issues related to polarization of the electrochemical cell in lithium-based batteries include, but are not limited to, plating of lithium at the cathode, electrolyte dissolution, accelerated capacity loss, voltage drop, and other issues as would be appreciated by one of ordinary skill in the art. Therefore, in some instances where cell polarization occurs due to rate limitations within the electrochemical cell, it may be desirable to use a modified discharge profile during cell formation to avoid polarization.

As described in more detail below, modified discharge profiles to avoid polarization may include, but are not limited to, the use of discharge pulses, rests, reverse discharge pulses (i.e. charging pulses), and alternating high and low discharge rates. For example, at least one reverse pulse and/or a rest may be applied between each of a plurality of discharge pulses to permit time for the electroactive species to diffuse into the cathode and avoid polarization of the electrochemical cell. In addition to altering the discharge profile to avoid polarization, the depth of discharge may also be limited to avoid polarization. For example, a constant discharge may be applied until a preselected depth of discharge is reached and/or cell polarization is observed. Alternatively, a constant current discharge portion at a first rate may be applied until a preselected depth of discharge is reached and/or cell polarization occurs. Upon reaching the preselected depth of discharge and/or the cell polarizing, pulses, rests, reverse discharge pulses, and/or alternating high and low discharge rates may be implemented to permit further discharge of the cell while avoiding further cell polarization.

Figure 2B:
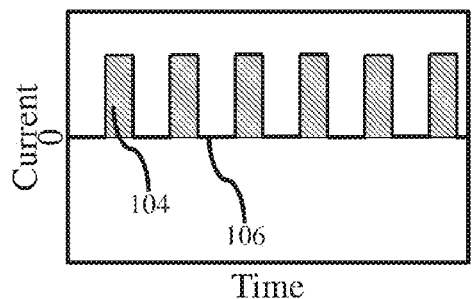
FIG. 2B is a schematic representation of a pulsed discharge according to one set of embodiments.
Figure 2C:
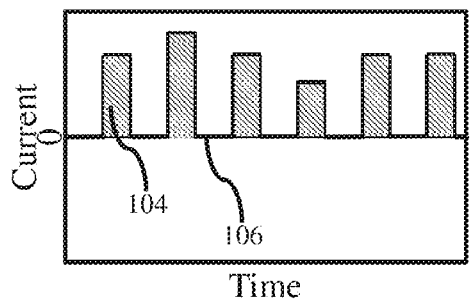
FIG. 2C is a schematic representation of a pulsed discharge with variable pulse magnitudes according to one set of embodiments.

In one embodiment, as depicted in FIG. 2B, the discharge profile used during formation comprises a plurality of discharge pulses 104 and corresponding rest periods 106. During the discharge pulses 104, a preselected discharge current is applied to the electrochemical cell for a preselected amount of time. This time may be substantially constant for each pulse, or it may vary. For example, this time may be controlled such that discharge is terminated upon the electrochemical cell reaching a certain polarization.

Additionally or alternatively, the rest time between each pulse may be varied throughout the formation process. Between the individual discharge pulses, rests 106 may correspond to substantially zero discharge current being applied to the electrochemical cell. The rest durations may be any appropriate amount of time that avoids polarization of the electrochemical cell. In some embodiments, the duration of each rest 106 may be selected such that the lithium stripped from the anode and dissolved within the electrolyte is able to intercalate into the cathode without an excess buildup of lithium within the electrolyte which could lead to polarization of the electrochemical cell. In some embodiments, it may be desirable to vary the discharge current applied during separate discharge pulses, as shown illustratively in FIG. 2C. A such, the discharge current may be substantially constant in magnitude, or the magnitudes may vary, between individual discharge pulses.

Figure 2D:
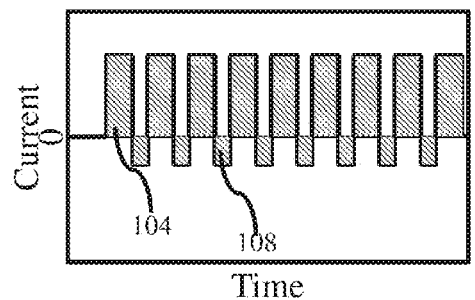
FIG. 2D is a schematic representation of a pulsed discharge with reverse pulses according to one set of embodiments.

In yet another embodiment, as depicted in FIG. 2D, the discharge profile during formation includes discharge pulses 104 and reverse pulses 108. Similar to the above, the individual discharge pulses may be substantially similar in magnitude and duration, or the magnitudes and durations of the individual discharge pulses may be varied. In the current embodiment, the reverse pulses depicted in FIG. 2D correspond to a potential applied in the opposite direction of the discharge pulses, i.e., the reverse pulses act as a pulsed charging potential. The reverse pulses 108 may include any appropriate combination of magnitude and duration, e.g., to ensure that the lithium stripped from the anode and dissolved within the electrolyte is able to diffuse into the cathode without an excess buildup of lithium within the electrolyte which could lead to polarization.

The magnitude and duration of the individual reverse pulses may either be substantially constant, or they may vary. In some embodiments, the magnitude of the discharge current of one or more reverse pulses is approximately equal to the magnitude of the discharge current for at least one of the plurality of discharge pulses. In some instances, the magnitude of one or more reverse pulses may be greater than the magnitude of one or more discharge pulses. In other instances, the magnitude of one or more reverse pulses may be less than the magnitude of one or more discharge pulses. However, regardless of the specific durations and magnitudes used for the individual discharge pulses and reverse pulses, the sum of the energy from the reverse pulses will be less than the sum of energy from the discharge pulses resulting in a net discharge of the electrochemical cell during the formation process.

Figure 2E:
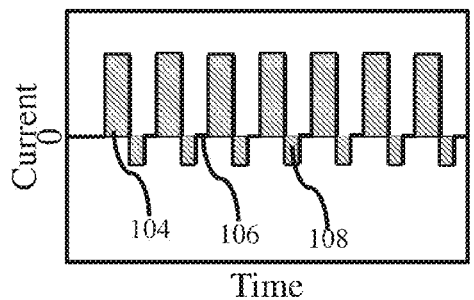
FIG. 2E is a schematic representation of a pulsed discharge with reverse pulses and rests according to one set of embodiments.

In another embodiment, as depicted in FIG. 2E, the discharge profile during formation includes a combination of discharge pulses 104, rests 106, and reverse pulses 108. The durations and magnitudes of the discharge pulses, rests, and reverse pulses may be selected in any appropriate combination that substantially avoids or minimizes polarization of the cells as described herein.

Figure 2F:
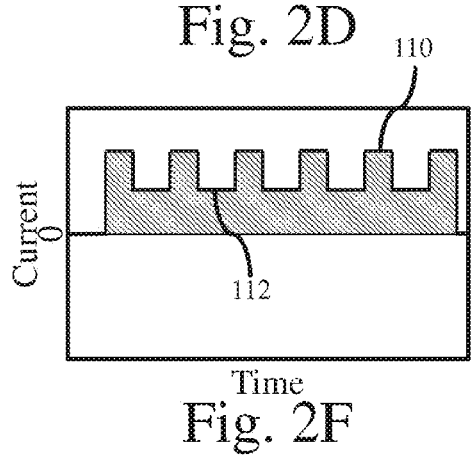
FIG. 2F is a schematic representation of a constant current discharge with alternating high and low rate portions according to one set of embodiments.

In yet another embodiment, as depicted in FIG. 2F, the discharge profile during formation includes alternating high rate discharge portions 110 and low rate discharge portions 112. The magnitude and duration of the high rate discharges 110 may be appropriately selected to provide the benefit of the active surface pretreatment described herein. The magnitude and duration of the low rate discharges 112 may be appropriately selected such that the lithium stripped from the anode and dissolved within the electrolyte is able to intercalate into the cathode without an excess buildup of lithium within the electrolyte which could lead to polarization. In some embodiments, the low rate discharges 112 may also have discharge rates capable of providing the benefit of the active surface pretreatment as described herein.

While the discharge profiles disclosed in the figures are depicted as being step functions, it should be appreciated that any suitable discharge profile shape could be used. For example, the discharge profiles could include linear, or non-linear, transitions between the discharge pulses, rests, reverse pulses, and constant current portions. In addition, the discharge profiles do not need to include constant current portions. For example, the discharge current could vary during and between individual portions of the discharge profile. Furthermore, while the discharge profiles have been described in terms of constant current it is also possible to control the discharge profiles through the use of constant voltage, constant power, any appropriate combination of the above, or any other appropriate control technique capable of controlling the discharge rate of an electrochemical cell as would be appreciated by one of ordinary skill in the art.

In another embodiment, multiple consecutive charge/discharge cycles are used during the formation process instead of a single discharge. The number of cycles can be, for example, greater than or equal to 2 cycles, 3 cycles, 4 cycles, or 5 cycles. The number of cycles may also be, for example, less than or equal to 10 cycles, 9 cycles, 8 cycles, 7 cycles, 6 cycles, 5 cycles, 4 cycles, or 3 cycles. Combinations of the above-referenced ranges are also possible. For example, the number of charge/discharge cycles could be greater than or equal to 2 cycles and less than or equal to 5 cycles. In addition to the use of multiple charge/discharge cycles, the same or different charge and/or discharge profiles can be implemented for each of the individual charge/discharge cycles. In some embodiments, the depth of discharge associated with each charge/discharge cycle is selected to avoid polarization of the cell and/or provide conditioning of the active surface. Appropriate charge/discharge rates and depths of discharge for each cycle are described in more detail below. It should be understood that different combinations of numbers of cycles, charge/discharge rates, and depth of discharge are possible. Furthermore, without wishing to be bound by theory, combining multiple charge/discharge cycles with lower depths of discharge can help to avoid cell polarization during conditioning of the active surface.

As noted above, any appropriate combination of durations and magnitudes may be used for the discharge pulses, rests, and reverse pulses. Specific ranges for these durations and magnitudes are stipulated below for various non-limiting embodiments.

In one embodiment, the discharge rate profiles may be greater than or equal to approximately a 2 C discharge rate, a 2.5 C discharge rate, a 3 C discharge rate, a 3.5 C discharge rate, a 4 C discharge rate, a 4.5 C discharge rate, a 5 C discharge rate, a 5.5 C discharge rate, a 6 C discharge rate, a 6.5 C discharge rate, a 7 C discharge rate, a 7.5 C discharge rate, an 8 C discharge rate, an 8.5 C discharge rate, a 9 C discharge rate, a 9.5 C discharge rate, a 10 C discharge rate, a 15 C discharge rate, a 20 C discharge rate, or a 25 C discharge rate. The discharge rates may also be less than or equal to approximately a 30 C discharge rate, a 25 C discharge rate, a 20 C discharge rate, a 15 C discharge rate, a 10 C discharge rate, a 9 C discharge rate, an 8 C discharge rate, a 7 C discharge rate, a 6 C discharge rate, a 5.5 C discharge rate, a 5 C discharge rate, a 4.5 C discharge rate, or a 4 C discharge rate. Combinations of the above noted ranges are also possible (e.g., a discharge rate of greater than or equal to approximately a 3 C discharge rate and less than or equal to approximately a 10 C discharge rate). Other ranges are also possible. As known within the art, a 1 C rate corresponds to charging/discharging of a cell within one hour. Similarly, a 2 C rate corresponds to charging/discharging of a cell within a half-hour.

In one specific example, a lithium metal based electrode may be discharged at a rate greater than or equal to approximately 2.5 mA cm$^{-2}$ (3 C), 3 mA cm$^{-2}$ (3.6 C), 3.5 mA cm$^{-2}$ (4.2 C), 4 mA cm$^{-2}$ (4.8 C), 4.5 mA cm$^{-2}$ (5.4 C), 5 mA cm$^{-2}$ (6 C), 5.5 mA cm$^{-2}$ (6.6 C), or 6 mA cm$^{-2}$ (7.2 C). In such an embodiment, the lithium metal based electrode may also be discharged at a rate of less than or equal to approximately 12 mA cm$^{-2}$ (14.4 C), 11 mA cm$^{-2}$ (13.2 C), 10 mA cm$^{-2}$ (12 C), 9 mA cm$^{-2}$ (10.8 C), 8 mA cm$^{-2}$ (9.6 C), 7 mA cm$^{-2}$ (8.4 C), 6 mA cm$^{-2}$ (7.2 C), 5 mA cm$^{-2}$ (6 C), or 4 mA cm$^{-2}$ (4.8 C). Combinations of the above noted ranges are also possible (e.g., a discharge rate of greater than or equal to approximately a 2.5 mA cm$^{-2}$ discharge rate and less than or equal to approximately a 12 mA cm$^{-2}$ discharge rate). Other ranges are also possible.

The duration of the discharge pulses may be greater than or equal to approximately 1 ms, 3 ms, 5 ms, 7 ms, 10 ms, 12 ms, 15 ms, 17 ms, 20 ms, or 50 ms. In addition, the duration of discharge pulses may be less than or equal to approximately 100 ms, 70 ms, 50 ms, 40 ms, 30 ms, 20 ms, or 10 ms. Combinations of the above noted ranges are also possible (e.g., the plurality of discharge pulses may have durations that are greater than or equal to approximately 5 ms and less than approximately 100 ms). Other ranges are also possible.

In some embodiments, the duration of the rest between each discharge pulse is greater than or equal to approximately 0.1, 0.2, 0.4, 0.6, 0.8, 1, 1.5, 2, 2.5, 3, 3.5, 4, 4.5, or 5 times the duration of at least one discharge pulse. In addition, the duration of the rest between each discharge pulse may be less than 10, 8, 5, 3, 2, or 1 times the duration of at least one discharge pulse. Combinations of the above noted ranges are also possible (e.g., the durations of the rest between each discharge pulse may be greater than or equal to 0.1 times the duration of at least one discharge pulse and less than 10 times the duration of at least one discharge pulse). Other ranges are also possible.

As noted above, in addition to avoiding polarization of an electrochemical cell during formation using a combination of discharge rates, discharge pulses, rests, and/or reverse pulses, it is also possible to avoid polarization of the electrochemical cell by limiting the depth of discharge. Consequently, the depth of discharge may be limited to a preselected amount, e.g., such that polarization of the electrochemical cell is substantially avoided or reduced compared to that absent a pretreatment process described herein. In some embodiments, the preselected depth of discharge is greater than or equal to approximately 5%, 8%, 10%, 12%, 14%, 16%, 18%, or 20%. In addition, the preselected depth of discharge may be less than or equal to approximately 75%, 70%, 60%, 50%, 40%, 30%, 25%, 20%, 18%, 16%, 14%, 12%, 10%, or 8%. Combinations of the above noted ranges are also possible (e.g., the preselected depth of discharge may be greater than or equal to approximately 5% and less than or equal to approximately 75%, or greater than or equal to approximately 20% and less than or equal to approximately 50%). Other ranges are also possible.

In some embodiments, it may be desirable to apply a force substantially normal to the active surfaces of the electrochemical cell. In some instances, the force may be an anisotropic force with a component that is normal to the active surfaces. Without wishing to be bound by theory, it is believed that application of a force substantially normal to the active surfaces may result in suppression of dendrite growth and/or the formation of mossy lithium. Given appropriate design considerations, such a technique may be implemented for cell types such as coin cells and other flat cell types, prismatic cells, and other cell types.

The component of the force normal to active surface of the electrode may, for example, define a pressure of greater than or equal to approximately 4.9 N/cm$^2$, at least 5 N/cm$^2$, 9.8 N/cm$^2$, 10 N/cm$^2$, 14.7 N/cm$^2$, 15 N/cm$^2$, 19.6 N/cm$^2$, 20 N/cm$^2$, 24.5 N/cm$^2$, 25 N/cm$^2$, at least 29.4 N/cm$^2$, 30 N/cm$^2$, 34.3 N/cm$^2$, 39 N/cm$^2$, 45 N/cm$^2$, 49 N/cm$^2$, 50 N/cm$^2$, 70 N/cm$^2$, 78 N/cm$^2$, 98 N/cm$^2$, 100 N/cm$^2$, 117.6 N/cm$^2$, 147 N/cm$^2$, or any other appropriate pressure. In some embodiments, the component of the anisotropic force normal to a surface of the electrode may, for example, define a pressure of less than approximately 200 N/cm$^2$, 196 N/cm$^2$, 150 N/cm$^2$, 147 N/cm$^2$, 120 N/cm$^2$, 117.6 N/cm$^2$, 100 N/cm$^2$, 98 N/cm$^2$, 50 N/cm$^2$, 49 N/cm$^2$, 25 N/cm$^2$, 24.5 N/cm$^2$, 9.8 N/cm$^2$, or any other appropriate pressure. Combinations of the above-referenced ranges are also possible (e.g., a pressure of at least 40 N/cm$^2$ and less than 200 N/cm$^2$). Other ranges are also possible. In some cases, the component of the force normal to the anode active surface may define a pressure of between 4.9 N/cm$^2$ and 147 N/cm$^2$, between 49 N/cm$^2$ and 117.6 N/cm$^2$, or between 68.6 N/cm$^2$ and 98 N/cm$^2$. Other ranges, and combinations of the above noted ranges are also possible. While forces and pressures are generally described herein in units of Newtons and Newtons per unit area, respectively, forces and pressures can also be expressed in units of kilograms-force and kilograms-force per unit area, respectively. One or ordinary skill in the art will be familiar with kilogram-force-based units, and will understand that 1 kilogram-force is equivalent to about 9.8 Newtons.

Depending upon the composition and deposition method of the electroactive material, different crystalline structures with different properties may be formed. For example, vacuum deposited lithium generally forms hexagonal crystallites that have triple points located along the grain boundaries where crystallites meet. These triple points have relatively high diffusion rates resulting in them being preferential points for pitting. Therefore, to reduce the amount of pitting present in the active surface it may be desirable to disrupt the formation of these particular crystallites. Consequently, in some embodiments the formation of a particular crystal structure may be disrupted by alloying the electroactive material with another material. For example, in lithium based electrochemical cells, lithium (e.g., lithium metal) may be alloyed with one or more alloy materials such as aluminum, antimony, arsenic, magnesium, potassium, silicon, silver, sodium, and tin, or combinations thereof. The resulting alloys may preferentially have a crystalline structure that is less prone to pitting.

In some embodiments, an alloy material, such as the one or more materials noted above, is alloyed with a base electrode material in an amount greater than or equal to 5 ppm, 10 ppm, 25 ppm, 50 ppm, 100 ppm, 200 ppm, 300 ppm, 400 ppm, 500 ppm, 1000 ppm, or any other appropriate concentration. Correspondingly, in some embodiments, the alloy material is alloyed with the base electrode material in an amount less than or equal to 5000 ppm, 2000 ppm, 1000 ppm, 500 ppm, 400 ppm, 300 ppm, 200 ppm, 100 ppm, 50 ppm, 25 ppm, or 10 ppm, or any other appropriate concentration. Combinations of the above-referenced ranges are also possible (e.g., an alloy material may be alloyed with a base electrode material in an amount greater than or equal to 5 ppm and less than or equal to 500 ppm). Other ranges are also possible.

In another embodiment, the proportion of the alloy material is defined based upon a weight percentage. For example, the alloy material may be alloyed with the base electrode material in an amount greater than or equal to approximately 0.01 wt %, 0.1 wt %, 0.5 wt %, 1 wt %, 2 wt %, 5 wt %, 10 wt %, 15 wt %, 20 wt %, 25 wt %, 30 wt %, 35 wt %, 40 wt %, or any other appropriate weight percentage of the electroactive material (i.e., base electrode material). Furthermore, the alloy material may be alloyed with the base electrode material in an amount less than or equal to approximately 50 wt %, 45 wt %, 40 wt %, 35 wt %, 30 wt %, 25 wt %, 20 wt %, 15 wt %, 10 wt %, 5 wt %, 2 wt %, 1 wt %, or any other appropriate weight percentage of the electroactive material (i.e., base electrode material). Combinations of the above-referenced ranges are also possible. For example, the alloy material may be alloyed with the base electrode material in an amount greater than or equal to approximately 0.01 wt % and less than or equal to approximately 50 wt % of the electroactive material (i.e., base electrode material). Other combinations are also possible. As used herein, "wt %" means percent by total weight of the electroactive material of the electrode itself, absent current collector, electrolyte and other materials.

In other embodiments, crystallite formation is disrupted using ceramic particles distributed throughout the bulk of the electroactive material. Without wishing to be bound by theory, the ceramic particles may disrupt the crystallite formation due to any number of physical mechanisms including, but not limited to, seeding a different crystal structure using the ceramic particles, disrupting crystallite formation, or other mechanisms as would be appreciated by one of ordinary skill in the art. The ceramic particles may include, but are not limited to, lithium nitride, lithium silicate, lithium borate, lithium aluminate, lithium phosphate, lithium phosphorus oxynitride, lithium silicosulfide, lithium germanosulfide, lithium oxides, lithium lanthanum oxides, lithium titanium oxides, lithium borosulfide, lithium aluminosulifide, and lithium phosphosulfide. The ceramic particles may be deposited in any appropriate manner as would be appreciated by one of ordinary skill in the art, including co-deposition methods and/or formation of the ceramic on the active surface during deposition. For example, a gas such as nitrogen, oxygen, carbon dioxide, nitrous oxide, acetylene, and other appropriate gases could react with an exposed lithium electrode active surface during deposition to form the desired ceramic particles. To avoid complete reaction of the electroactive material with the gas, the rate of lithium deposition, pressure of the gas, temperature, and other appropriate parameters may be controlled as would be appreciated by one of ordinary skill in the art.

In yet another embodiment, crystallite grain size of an electroactive material is reduced to enhance the uniformity of discharge. Without wishing to be bound by theory, an electroactive material comprising a smaller average grain size, such as a nanocrystalline grain size, may discharge more uniformly as compared to an active material having a larger average grain size. In some embodiments described herein, the crystallites of an electroactive material have an average grain size that is less than approximately 1 micrometer corresponding to a nanocrystalline structure. In some embodiments, the average grain size is less than or equal to approximately 0.8 micrometers, 0.6 micrometers, 0.4 micrometers, or 0.2 micrometers, In some cases, the average grain size is greater than or equal to 0.01 micrometers, 0.1 micrometers, 0.2 micrometers, 0.4 micrometers, 0.6 micrometers, or 0.8 micrometers. Combinations of the above-referenced ranges are also possible (e.g., an average grain size of greater than or equal to 0.1 micrometers and less than or equal to 1 micron). Other ranges are also possible.

The reduction in grain size and/or nanocrystalline structure can be achieved using any appropriate method. In one exemplary embodiment, lithium material is vacuum deposited onto a substrate to form an amorphous lithium layer. During lithium deposition, a reactive gas is directed across the deposition surface to control the crystallization process. In one specific set up, a gas manifold is positioned adjacent (e.g., right after) a lithium evaporator which directs a reactive gas directly over the deposition surface as the lithium is deposited. Without wishing to be bound by theory, the reactive gas may react with the deposited amorphous lithium to form multiple seed crystals throughout the material. These seed crystals act as individual nucleation points for the subsequent growth of crystalline domains from the deposited amorphous lithium during crystallization. By appropriately selecting the lithium deposition rate and the flow rate of the reactive gas the number of seed crystals may be altered. By increasing the number of seed crystals, the size of the resulting grain structure is reduced. Correspondingly, by decreasing the number of seed crystals, the size of the resulting grain structure is increased. In some embodiments, the number of seed crystals are controlled to form a nanocrystalline grain structure, a microcrystalline grain structure, or any other appropriately sized grain structure. Depending upon the specific embodiment, the reactive gas may comprise or may be, for example, at least one of carbon dioxide, sulfur dioxide, nitrogen dioxide, nitrous oxide, acetylene, other appropriate reactive gases, and combinations of the above.

Even though the currently disclosed methods for formation of an electrochemical cell attempt to avoid polarization of the cell during formation through the use of specific discharge rates, discharge pulses, rests, and/or preselected depths of discharge, in some embodiments the electrolyte may undergo decomposition during the high rate discharge. In some instances, the noted electrolyte decomposition may desirably form a beneficial layer. For example, portions of the electrolyte may be consumed during a reaction to form a solid electrolyte interface (SEI) layer on the top surface of an electroactive layer or a protective layer. In some embodiments, the layer formed at least in part by components in the electrolyte may be an ion conductive layer.

However, regardless of how the electrolyte may be lost, depending upon the amount of electrolyte lost, the performance of the electrochemical cell may be impacted. For example, the cell impedance may increase and the ion conductivity may decrease due to insufficient electrolyte being present. To alleviate the above condition, a calculated amount of excess electrolyte may be included in the cell to compensate for the amount of electrolyte decomposed during the applied high rate discharge. The specific amount of excess electrolyte needed will vary according to the specific chemistry in question and the specific formation process. Such a determination would require routine testing within the ability of one of ordinary skill in the art.

Oftentimes it is desirable for the electrode to include one or more protective layers such as ion conductive layers. These ion conductive layers are generally disposed on the active surface and act to isolate the electroactive material from the electrolyte and other components within the electrochemical cell. These layers may be included as part of a particular electrode design, or they may simply be the result of an active surface of an electrode reacting with the electrolyte present within the electrochemical cell. Depending upon the particular purpose of the ion conductive layer, it may be electrically conducting or electrically insulating. However, regardless of its electrical conductivity, the ion conductive layer is conductive to the electroactive species within the electrochemical cell. With respect to the current discussion regarding lithium-based cells, the ion conductive layer is a lithium ion conductive layer. Suitable materials for the ion conductive layer include, but are not limited to, lithium nitride, lithium silicate, lithium borate, lithium aluminate, lithium phosphate, lithium phosphorus oxynitride, lithium silicosulfide, lithium germanosulfide, lithium oxides, lithium lanthanum oxides, lithium titanium oxides, lithium borosulfide, lithium aluminosulifide, and/or lithium phosphosulfide.

Additionally or alternatively, in some embodiments, the ion conducting layer may be an ion conducting polymer layer. Suitable polymers include, but are not limited to, both electrically conducting and electrically insulating ion conduction polymers. Possible electrically conducting polymers include, but are not limited to, poly(acetylene)s, poly(pyrrole)s, poly(thiophene)s, poly(aniline)s, poly(fluorene)s, polynaphthalenes, poly(p-phenylene sulfide), and poly(para-phenylene vinylene)s. Possible electrically insulating polymers include, but are not limited to, acrylate, polyethyleneoxide, silicones, and polyvinylchlorides. The above polymers may be doped with ion conducting salts to provide, or enhance, the desired ion conducting properties. Appropriate salts for lithium based cells include, for example, LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, and LiN(SO$_2$CF$_3$)$_2$ though other salts may be used for other chemistries.

Without wishing to be bound by theory, it is believed that the currently disclosed methods for pretreating an active surface during cell formation may result in the ion conductive layer remaining substantially intact after the first discharge due to the fewer number of surface defects and pits introduced during the currently disclosed formation process as compared to traditional formation techniques.

The ion conductive layer may be formed using any appropriate method including, but not limited to, plasma conversion based techniques, electron beam evaporation, magnetron sputtering, chemical vapor deposition, and any other appropriate formation or deposition technique. Alternatively, the layer of electroactive material may be exposed to a gas, such as nitrogen, under suitable conditions to react with the electroactive material at an exposed surface of the electroactive material layer to form the ion conductive layer.

In some embodiments including an ion conductive layer, the ion conductive layer is an embedded ion conductive layer disposed between two layers of an electroactive material. For example, as shown illustratively in FIG. 3A, an electrode 200 includes a first layer of electroactive material 202 comprising an active electrode species (e.g., lithium), an embedded ion conductive layer 204, and a second layer of the electroactive material 206 also comprising the active electrode species. The first and second layers 202 and 206 have first and second capacities respectively. In addition, the ion conductive layer 204 is conductive to the active electrode species of the first and second layers 202 and 206. The second layer 206 may either be in direct contact with the electrolyte, or in indirect contact with the electrolyte through some form of a surface layer or structure (e.g., a protective structure such as an ion conductive layer, a polymer layer, or combinations thereof). It is noted that although ion conductive layer 204 is illustrated and described as "embedded" in this description, it is noted that the layer need not be partially or fully embedded. In many or most cases, ion conductive layer 204 is a substantially thin, two-sided structure coated on each side by electroactive material, but not covered by electroactive material at its edges. However, any appropriate configurations in which two layers of electroactive material are substantially separated by the ion conductive layer 204 are also considered within the scope of this disclosure.

Figure 3A:
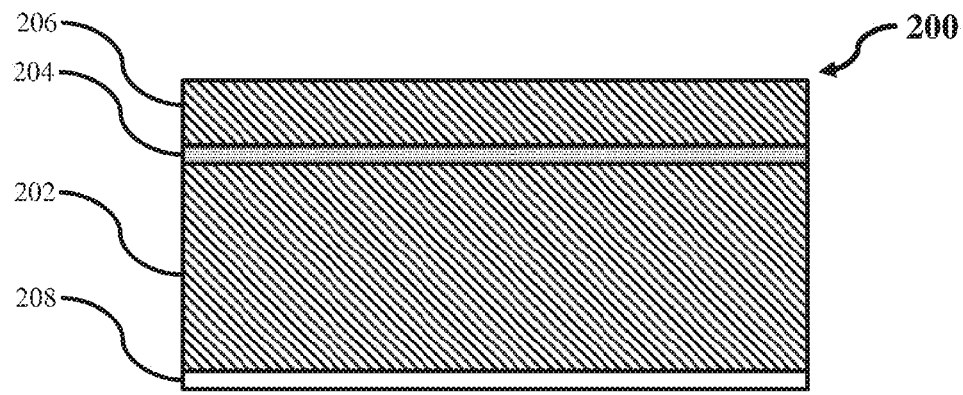
FIG. 3A is a schematic representation of an electrode incorporating a buried ion conductive protective layer according to one set of embodiments.
Figure 3B:
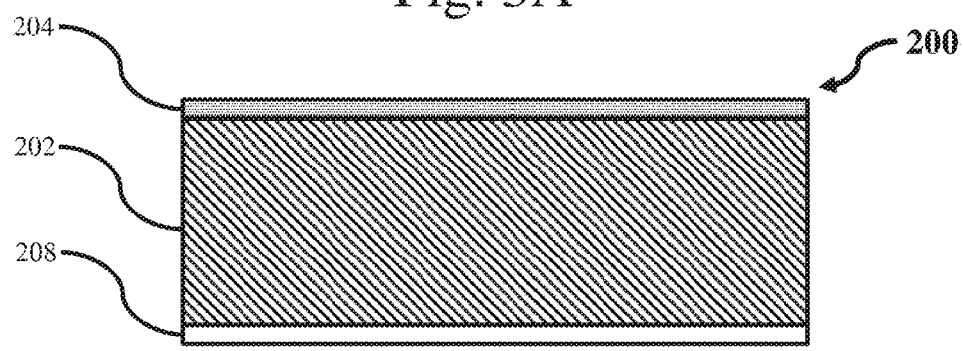
FIG. 3B is the electrode of FIG. 3A after discharge according to one set of embodiments.

In one set of embodiments, the initial discharge of the electrode depicted in FIG. 3A corresponds to FIG. 3B, where the electrode has been discharged to a depth of discharge substantially corresponding to the capacity of the second layer 206 contacting the electrolyte of the cell. At this depth of discharge, substantially all of the electroactive material has been removed from the second layer 206. In some cases, this discharge may be done according to the conditioning methods disclosed herein described for formation. In other embodiments, a discharge process involves removing substantially all of the electroactive material from second layer 206, and also some (but not all) of the electroactive material from first layer 202. That is, the process may involve discharging the anode to a depth of discharge corresponding to at least the second capacity, thereby substantially removing the active electrode species from the second electroactive layer during the first discharge.

In another set of other embodiments, an electrochemical cell may be designed to include the electrode shown in FIG. 3A which is subjected to the same formation process described above, but the depth of discharge may be such that the second layer 206 is not substantially removed during the initial discharge of the cell during the formation process. Instead, the depletion of the second layer 206 may occur during subsequent usage by a user. In some cases, the initial discharge may be done according to the conditioning methods disclosed herein described for formation.

Figure 3C:
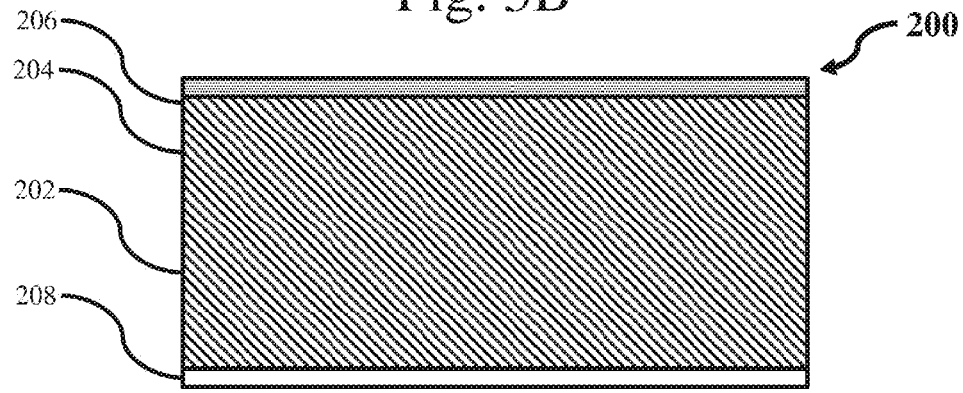
FIG. 3C is the electrode of FIG. 3B after subsequent charging according to one set of embodiments.

Upon subsequent charging, electroactive material may be deposited through ion conductive layer 204 (which is now no longer embedded between two electroactive layers) into the first layer 202 in an amount very slightly less than that removed from the electrode during discharge due to irreversible reactions of the electroactive species within the electrochemical cell, as shown illustratively in FIG. 3C. Without wishing to be bound by theory, it is believed that the first discharge of electrode 200, where at least one ion conductive layer is below an active surface (e.g., second layer 206), may undergo less polarization than a cell with the ion conductive layer on the active surface since the lithium surface has a lower resistance as compared to a surface with an ion conductive layer. The resulting lower amount of polarization may result in less pitting and defects being formed on the active surface as well as a lower amount of electrolyte degradation.

It should be appreciated that the components shown in the figures are not limiting and that in some embodiments, certain components shown in the figures need not be present in an article, and in other embodiments, other components may optionally be present. For example, in some embodiments, in addition to embedded layer 204, electrode 200 of FIG. 3C may include one or more layers (e.g., protective layers) positioned on top of second layer 206. It should also be appreciated that any of the description herein pertaining to the systems and components shown in the figures, including the methods of operating the systems and components shown in the figures, may also be applied to the other systems and components described herein. In some embodiments, a method of using the electrode shown in FIG. 3 involves providing an anode comprising a first electroactive layer comprising an active electrode species, the first electroactive layer having a first capacity, a second electroactive layer comprising the active electrode species, the second electroactive layer having a second capacity, and an ion conductive protective layer disposed between the first and second electroactive layers. The method may involve discharging the anode to a depth of discharge corresponding to at least the second capacity, thereby substantially removing the active electrode species from the second electroactive layer during the first discharge. The method may also involve depositing at least a portion of the active electrode species in the first electroactive layer through the ion conductive layer during at least one charge.

The thickness of the embedded layer 204 may depend on, for example, the type of material used to form the embedded layer and/or the method of depositing the material. In some embodiments, the thickness of the embedded layer may be greater than or equal to 0.01 microns, 0.1 microns, 0.5 microns, 1 micron, 2 microns, 5 microns, 7 microns, 10 microns, 20 microns, 30 microns, 40 microns, or 50 microns. The thickness of the embedded layer may also be less than or equal to 100 microns, 50 microns, 10 microns, 1 microns, 0.5 microns, or 0.1 microns. Combinations of the above-referenced ranges are also possible (e.g., a thickness of greater than or equal to 0.1 microns and less than 50 microns). In some embodiments the embedded layer thickness is between 0.01-0.1 microns, between 0.1-0.5 microns, or between 0.5-1 micron. In other embodiments, thicker embedded layers are included. For example, the embedded layer can have a thickness between 1-10 microns, between 10-50 microns, or between 50-100 microns. Other ranges are also possible.

The above disclosed formation process may be used with any suitable electrochemical system. In one embodiment, suitable cathode active materials for use in the cathode of the electrochemical cells include, but are not limited to, electroactive transition metal chalcogenides, electroactive conductive polymers, and electroactive sulfur-containing materials, and combinations thereof. As used herein, the term "chalcogenides" pertains to compounds that contain one or more of the elements of oxygen, sulfur, and selenium. Examples of suitable transition metal chalcogenides include, but are not limited to, the electroactive oxides, sulfides, and selenides of transition metals selected from the group consisting of Mn, V, Cr, Ti, Fe, Co, Ni, Cu, Y, Zr, Nb, Mo, Ru, Rh, Pd, Ag, Hf, Ta, W, Re, Os, and Ir. In one embodiment, the transition metal chalcogenide is selected from the group consisting of the electroactive oxides of nickel, manganese, cobalt, and vanadium, and the electroactive sulfides of iron. In one embodiment, the cathode active layer comprises an electroactive conductive polymer. Examples of suitable electroactive conductive polymers include, but are not limited to, electroactive and electronically conductive polymers selected from the group consisting of polypyrroles, polyanilines, polyphenylenes, polythiophenes, and polyacetylenes. Preferred conductive polymers are polypyrroles, polyanilines, and polyacetylenes.

"Electroactive sulfur-containing materials," as used herein, relates to cathode active materials which comprise the element sulfur in any form, wherein the electrochemical activity involves the breaking or forming of sulfur-sulfur covalent bonds. Suitable electroactive sulfur-containing materials, include, but are not limited to, elemental sulfur and organic materials comprising sulfur atoms and carbon atoms, which may or may not be polymeric. Suitable organic materials include those further comprising heteroatoms, conductive polymer segments, composites, and conductive polymers.

In some embodiments involving Li/S systems, the sulfur-containing material, in its oxidized form, comprises a polysulfide moiety, $S_m$, selected from the group consisting of covalent —$S_m$— moieties, ionic —$S_m^-$ moieties, and ionic $S_m^{2-}$ moieties, wherein m is an integer equal to or greater than 3. In one embodiment, m of the polysulfide moiety, $S_m$, of the sulfur-containing polymer is an integer equal to or greater than 6. In another embodiment, m of the polysulfide moiety, $S_m$, of the sulfur-containing polymer is an integer equal to or greater than 8. In another embodiment, the sulfur-containing material is a sulfur-containing polymer. In another embodiment, the sulfur-containing polymer has a polymer backbone chain and the polysulfide moiety, $S_m$, is covalently bonded by one or both of its terminal sulfur atoms as a side group to the polymer backbone chain. In yet another embodiment, the sulfur-containing polymer has a polymer backbone chain and the polysulfide moiety, $S_m$, is incorporated into the polymer backbone chain by covalent bonding of the terminal sulfur atoms of the polysulfide moiety.

In one embodiment, the electroactive sulfur-containing material comprises greater than 50% by weight of sulfur. In another embodiment, the electroactive sulfur-containing material comprises greater than 75% by weight of sulfur. In yet another embodiment, the electroactive sulfur-containing material comprises greater than 90% by weight of sulfur.

The nature of the electroactive sulfur-containing materials useful in the practice of this invention may vary widely, as known in the art. In one embodiment, the electroactive sulfur-containing material comprises elemental sulfur. In another embodiment, the electroactive sulfur-containing material comprises a mixture of elemental sulfur and a sulfur-containing polymer.

Examples of sulfur-containing polymers include those described in: U.S. Pat. Nos. 5,601,947 and 5,690,702 to Skotheim et al.; U.S. Pat. Nos. 5,529,860 and 6,117,590 to Skotheim et al.; and U.S. patent application Ser. No. 08/995,122 now U.S. Pat. No. 6,201,100 issued Mar. 13, 2001, to Gorkovenko et al. of the common assignee and PCT Publication No. WO 99/33130. Other suitable electroactive sulfur-containing materials comprising polysulfide linkages are described in U.S. Pat. No. 5,441,831 to Skotheim et al.; U.S. Pat. No. 4,664,991 to Perichaud et al., and in U.S. Pat. Nos. 5,723,230, 5,783,330, 5,792,575 and 5,882,819 to Naoi et al. Still further examples of electroactive sulfur-containing materials include those comprising disulfide groups as described, for example in, U.S. Pat. No. 4,739,018 to Armand et al.; U.S. Pat. Nos. 4,833,048 and 4,917,974, both to De Jonghe et al.; U.S. Pat. Nos. 5,162,175 and 5,516,598, both to Visco et al.; and U.S. Pat. No. 5,324,599 to Oyama et al.

Cathodes may further comprise one or more conductive fillers to provide enhanced electronic conductivity. Examples of conductive fillers include, but are not limited to, those including conductive carbons, graphites, activated carbon fibers, non-activated carbon nanofibers, metal flakes, metal powders, metal fibers, carbon fabrics, metal mesh, and electrically conductive polymers. The amount of conductive filler, if present, may be present in the range of 2 to 30% by weight of the cathode active layer. The cathodes may also further comprise other additives including, but not limited to, metal oxides, aluminas, silicas, and transition metal chalcogenides.

Cathodes may also comprise a binder. The choice of binder material may vary widely so long as it is inert with respect to the other materials in the cathode. Useful binders are those materials, usually polymeric, that allow for ease of processing of battery electrode composites and are generally known to those skilled in the art of electrode fabrication. Examples of useful binders include polytetrafluoroethylenes (Teflon), polyvinylidene fluorides ($PVF_2$ or PVDF), ethylene-propylene-diene (EPDM) rubbers, polyethylene oxides (PEO), UV curable acrylates, UV curable methacrylates, and heat curable divinyl ethers, and the like. The amount of binder, if present, may be present in the range of 2 to 30% by weight of the cathode active layer.

Electrolytes for use with the above noted electrochemical cells and electrode compositions function as a medium for the storage and transport of ions, and in the special case of solid electrolytes and gel electrolytes, these materials may additionally function as a separator between the anode and the cathode. With regards to the currently disclosed formation process, any suitable liquid, solid, or gel material capable of storing and transporting ions between the anode and the cathode may be used. The electrolyte may be electronically nonconductive to prevent short circuiting between the anode and the cathode. In one set of embodiments a non-aqueous-based electrolyte is used; in another set of embodiments, an aqueous-based electrolyte is used.

Examples of useful non-aqueous liquid electrolyte solvents include, but are not limited to, non-aqueous organic solvents, such as, for example, N-methyl acetamide, acetonitrile, acetals, ketals, esters, carbonates, sulfones, sulfites, sulfolanes, aliphatic ethers, acyclic ethers, cyclic ethers, glymes, polyethers, phosphate esters, siloxanes, dioxolanes, N-alkylpyrrolidones, substituted forms of the foregoing, and blends thereof. Examples of acyclic ethers that may be used include, but are not limited to, diethyl ether, dipropyl ether, dibutyl ether, dimethoxymethane, trimethoxymethane, dimethoxyethane, diethoxyethane, 1,2-dimethoxypropane, and 1,3-dimethoxypropane. Examples of cyclic ethers that may be used include, but are not limited to, tetrahydrofuran, tetrahydropyran, 2-methyltetrahydrofuran, 1,4-dioxane, 1,3-dioxolane, and trioxane. Examples of polyethers that may be used include, but are not limited to, diethylene glycol dimethyl ether (diglyme), triethylene glycol dimethyl ether (triglyme), tetraethylene glycol dimethyl ether (tetraglyme), higher glymes, ethylene glycol divinylether, diethylene glycol divinylether, triethylene glycol divinylether, dipropylene glycol dimethyl ether, and butylene glycol ethers. Examples of sulfones that may be used include, but are not limited to, sulfolane, 3-methyl sulfolane, and 3-sulfolene. Fluorinated derivatives of the foregoing are also useful as liquid electrolyte solvents. Mixtures of the solvents described herein can also be used.

In some embodiments, an electrolyte may be present as a polymer layer adjacent a protective structure (e.g., on a side opposite the current collector). In some cases, in addition to being able to function as a medium for the storage and transport of ions, a polymer layer positioned between an anode and cathode can function to screen the anode (e.g., a base electrode layer of the anode) from any cathode roughness under an applied force or pressure, keeping the anode surface smooth under force or pressure, and stabilizing any multi-layered structures of the anode (e.g., ceramic polymer multi-layer) by keeping the multi-layer pressed between the base electrode layer and the smooth polymer layer. In some such embodiments, the polymer layer may be chosen to be compliant and have a smooth surface.

Liquid electrolyte solvents can also be useful as plasticizers for gel polymer electrolytes. Examples of useful gel polymer electrolytes include, but are not limited to, those comprising one or more polymers selected from the group consisting of polyethylene oxides, polypropylene oxides, polyacrylonitriles, polysiloxanes, polyimides, polyphosphazenes, polyethers, sulfonated polyimides, perfluorinated membranes (NAFION resins), polydivinyl polyethylene glycols, polyethylene glycol diacrylates, polyethylene glycol dimethacrylates, derivatives of the foregoing, copolymers of the foregoing, crosslinked and network structures of the foregoing, and blends of the foregoing, and optionally, one or more plasticizers.

Examples of useful solid polymer electrolytes include, but are not limited to, those comprising one or more polymers selected from the group consisting of polyethers, polyethylene oxides, polypropylene oxides, polyimides, polyphosphazenes, polyacrylonitriles, polysiloxanes, derivatives of the foregoing, copolymers of the foregoing, crosslinked and network structures of the foregoing, and blends of the foregoing.

The electrolyte can comprise one or more ionic electrolyte salts to provide ionic conductivity, and may also comprise one or more liquid electrolyte solvents, gel polymer materials, or polymer materials. Suitable non-aqueous electrolytes may include organic electrolytes comprising one or more materials selected from the group consisting of liquid electrolytes, gel polymer electrolytes, and solid polymer electrolytes. Examples of non-aqueous electrolytes for lithium batteries are described by Dorniney in Lithium Batteries, New Materials, Developments and Perspectives, Chapter 4, pp. 137-165, Elsevier, Amsterdam (1994). Examples of gel polymer electrolytes and solid polymer electrolytes are described by Alamgir et al. in Lithium Batteries, New Materials, Developments and Perspectives, Chapter 3, pp. 93-136, Elsevier, Amsterdam (1994). As described herein, in some cases an electrolyte is used as a source of an electroactive material precursor.

Examples of ionic electrolyte salts for use in the electrolytes described herein include, but are not limited to, LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, and LiN(SO$_2$CF$_3$)$_2$. Other electrolyte salts that may be useful include lithium polysulfides (Li$_2$S$_x$), and lithium salts of organic ionic polysulfides (LiS$_x$R)$_n$, where x is an integer from 1 to 20, n is an integer from 1 to 3, and R is an organic group, and those disclosed in U.S. Pat. No. 5,538,812 to Lee et al. A range of concentrations of the ionic lithium salts in the solvent may be used such as from about 0.2 m to about 2.0 m (m is moles/kg of solvent). In some embodiments, a concentration in the range between about 0.5 m to about 1.5 m is used. The addition of ionic lithium salts to the solvent is optional in that upon discharge of Li/S cells the lithium sulfides or polysulfides formed typically provide ionic conductivity to the electrolyte, which may make the addition of ionic lithium salts unnecessary. Furthermore, if an ionic N—O additive such as an inorganic nitrate, organic nitrate, or inorganic nitrite is used, it may provide ionic conductivity to the electrolyte in which case no additional ionic lithium electrolyte salts may be needed.

As noted herein, in some embodiments an electrode can be used to enhance the lifetime of rechargeable lithium batteries employing aqueous-based electrolytes. As used herein, "aqueous-based electrolyte" means an electrolyte including at least 20%, by weight, water, and more typically at least 50%, 70%, 80%, or 95% or more water by weight. Several additional features described herein may be to assist function in a rechargeable battery useful in an aqueous environment, or an environment exposed to air or oxygen. In the case of an aqueous-based electrolyte, in one set of embodiments the electrolyte is formulated so as to have a pH of at least 7.1, and in other embodiments at least 7.2, 7.3, 7.4, 7.5, 7.6, 7.7, or 7.8 providing an electrolyte in basic form such as this inherently significantly reduces the presence of hydrogen ion which can be destructive if exposed to a lithium or other alkali metal electrode. In some embodiments, the electrolyte may have a pH between 7-8, between 8-9, between 9-10, between 10-11, or between 11-12 prior to the first discharge.

Formulating an electrolyte in basic form can be carried out by those of ordinary skill in the art, without undue experimentation, while providing the electrolyte with the ability to function effectively in the device and not causing inhibitory or other destructive behavior. Suitable basic species that may be added to an aqueous-based electrolyte, employed with a lithium battery, to achieve a basic pH as noted above may depend on, for example, the specific components of the lithium battery, the environment of use (e.g., an air/oxygen or water environment), the method of using the battery (e.g., a primary or secondary battery), etc. Suitable basic species may also be chosen based on the basicity (e.g., pH) of the species, the diffusivity of the species, and/or the likelihood of the species reacting with the electrolyte, other components in the electrolyte, components of the anode (e.g., polymer layers, single ion conductive layers, and electroactive layers), and/or the cathode material. Typically, chemical reaction between the basic species and such components of the battery are avoided. Accordingly, those of ordinary skill in the art can choose an appropriate basic species by, e.g., knowing the components of the battery and the likelihood of reactivity between the species and the components, and/or by a simple screening test.

One simple screening test may include adding the species to the electrolyte in the presence of a material component of the cell, e.g., a single-ion conductive material, and determining whether the species reacts and/or negatively effects the material. Another simple screening test may include adding the species to the electrolyte of the battery in the presence of the battery components, discharging/charging the battery, and observing whether inhibitory or other destructive behavior occurs compared to that in a control system. Other simple tests can be conducted by those of ordinary skill in the art.

Species that may be added to an aqueous-based electrolyte, employed with a lithium battery, to achieve a basic pH as noted above include bases comprising alkali and alkali earth metals (Group 1 and 2 metals, respectively), as well as ammonium-containing species (e.g., ammonium hydroxides, carbonates, and sulfides). Specific examples of species that can be added to an aqueous-based electrolyte to achieve a basic pH include, but are not limited to, ammonia, aniline, methylamine, ethylamine, pyridine, calcium carbonate, calcium hydroxide, ferrous hydroxide, potassium acetate, potassium bicarbonate, potassium carbonate, potassium cyanide, potassium hydroxide, sodium acetate, sodium benzoate, sodium bicarbonate, sodium carbonate, sodium hydroxide, sodium metasilicate, sodium sesquicarbonate, sodium phosphate, sodium hydrogen phosphate, sodium sulfite, sodium cyanide, trisodium phosphate, magnesium hydroxide, barium hydroxide, calcium hydroxide, lithium hydroxide, rubidium hydroxide, cesium hydroxide, and strontium hydroxide. It is routine for those of ordinary skill in the art to determine the amount of such an additive needed to create an electrolyte of desired pH.

In some embodiments, additives that may reduce or prevent formation of impurities and/or depletion of electrochemically active materials including electrodes and electrolyte materials, during charge/discharge of the electrochemical cell, may be incorporated into electrochemical cells described herein.

EXAMPLES

Example 1

In this example, tests were conducted at different discharge rates to determine the homogeneity of utilization of a lithium electrode versus discharge rate.

Figure 4A:
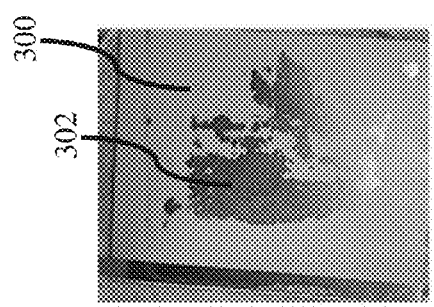
FIG. 4A is a photograph of a lithium metal anode after discharge at a current of 0.4 mA cm$^{-2}$ according to one set of embodiments.
Figure 4B:
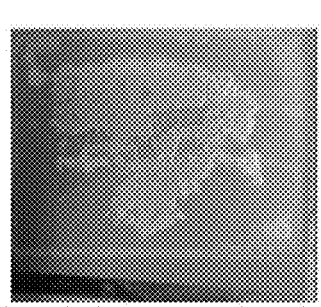
FIG. 4B is a photograph of the corresponding cathode of FIG. 4A according to one set of embodiments.

Testing was conducted on small flat lithium-lithium cells. Four separate control tests were performed using a discharge rate of 0.4 mA cm$^{-2}$ to approximately a 40% depth of discharge. The control tests were done using constant current, pulse and, and reverse pulse techniques. After opening the control cells, large areas of exposed copper were visually observed indicating dramatic pitting of the surface and inhomogeneous utilization of the lithium electrode. See, FIGS. 4A and 4B corresponding to the anode and cathode respectively of the control cell discharged using the reverse pulse technique.

Figure 5A:
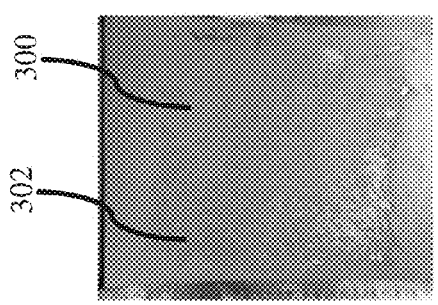
FIG. 5A is a photograph of a lithium metal anode after discharge at a current of 2.5 mA cm$^{-2}$ according to one set of embodiments.
Figure 5B:
FIG. 5B is a photograph of the corresponding cathode of FIG. 5A according to one set of embodiments.
Figure 6A:
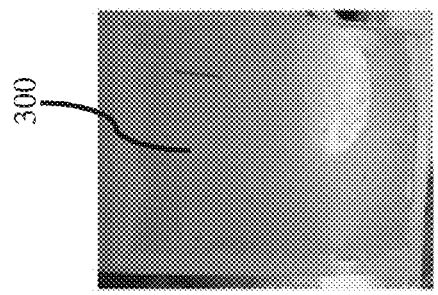
FIG. 6A is a photograph of a lithium metal anode after discharge at a current of 7.5 mA cm$^{-2}$ according to one set of embodiments.
Figure 6B:
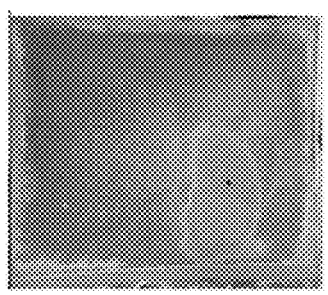
FIG. 6B is a photograph of the corresponding cathode of FIG. 6A according to one set of embodiments.
Figure 7A:
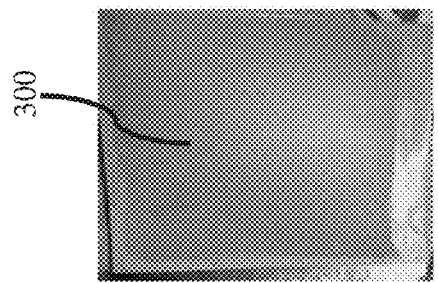
FIG. 7A is a photograph of a lithium metal anode after discharge at a current of 12 mA cm$^{-2}$ according to one set of embodiments.
Figure 7B:
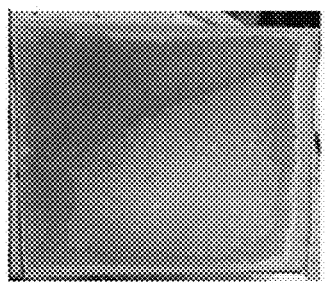
FIG. 7B is a photograph of the corresponding cathode of FIG. 7A according to one set of embodiments.

Similar experiments were conducted using a reverse pulse technique in which the cells were discharged with a discharge pulse of 150 ms and a reverse pulse of 50 ms to a depth of discharge of approximately 40%. The discharge pulse and reverse pulse discharge rates ranged between 2.5 mA cm$^{-2}$ to 12 mA cm$^{-2}$. FIGS. 5A and 5B are images of the anode and cathode surfaces of a cell subjected to a discharge rate of 2.5 mA cm$^{-2}$. FIGS. 6A and 6B are images of the anode and cathode surfaces of a cell subjected to a discharge rate of 7.5 mA cm$^{-2}$. FIGS. 7A and 7B are images of the anode and cathode surfaces of a cell subjected to a discharge rate of 12 mA cm$^{-2}$. As shown in the figures, improved anode utilization and reduced pitting of the lithium anode 300, as evidenced by the reduction in bare visible copper substrate 302, was observed at 2.5 mA cm$^{-2}$ and above.

Example 2

This example describes evaluation of the depth of discharge. Testing was conducted at discharge rates greater than or equal to 7.5 mA/cm$^2$ to depths of discharge ranging from approximately 5% to 40%. The discharge time was adjusted for each discharge rate to reach the desired depth of discharge for each particular test. Changes in the depth of discharge of lithium showed that values greater than approximately a 15% depth of discharge resulted in beneficial activation of the lithium surface for subsequent cycling. However, benefits were also observed for depths of discharge less than this amount including at least a 10% depth of discharge.

Example 3

These experiments were conducted to determine whether or not different cathode compositions and surfaces would affect the activation and subsequent homogeneous utilization of an anode pretreated using the formation methods disclosed herein.

Small flat cells were constructed using a lithium electrode and four separate opposing cathodes. The cells were cathode centered (e.g., the capacity of the cathode is less than that of the anode). The four cathode materials chosen for the experiments included: Milestone® (20% XE2/20% Vulcan) FIGS. 8A and 8B; 40% plain mesocarbon microbeads (MCMB) FIGS. 9A and 9B; sintered nickel impregnated with elemental sulfur FIGS. 10A and 10B; and 20% MCMB and 20% Vulcan® FIGS. 11A and 11B. All of the above cathodes included 55% Sulfur and 5% polyvinyl alcohol binder and sintered nickel cathodes. Cells corresponding to the different cathode compositions were discharged at 0.4 mA cm$^{-2}$ and 4.2 mA cm$^{-2}$ to a preselected 20% depth of discharge. Similar to the above the cells discharged at 4.2 mA cm$^{-2}$ corresponding to FIGS. 8B, 9B, 10B, and 11B had smaller, more distributed, pits 402 and more uniform anode utilization as compared to the cells discharged at 0.4 mA cm$^{-2}$ corresponding to FIGS. 8A, 9A, 10A, and 11A which had larger, more isolated, pitting 402 on the active surface. FIGS. 8A-11B were taken at the same magnification. In addition, similar anode utilization and pitting is seen for the cells discharged at the same rate regardless of the corresponding cathode used. Therefore, the observed improvement in the anode surface utilization from the applied high rate discharge appears to be independent of the cathode composition. However, without wishing to be bound by theory, it should be noted that roughness of the cathode can influence activation of the anode surface. Furthermore, in some embodiments, cathodes having lower rate capabilities may require the use of pulsed, stepped, and/or tapered discharges in order to be used with the currently disclosed high discharge rates without undergoing polarization.

Example 4

In order to determine if the structural advantages of a fast rate discharge were still present after subsequent cycling, three cells (lithium based cathode centered small flat cells with nominal design capacities of approximately 60 mAh) were subjected to three different formation processes and cycled five times.

Figures 12A, 12B, 12C:
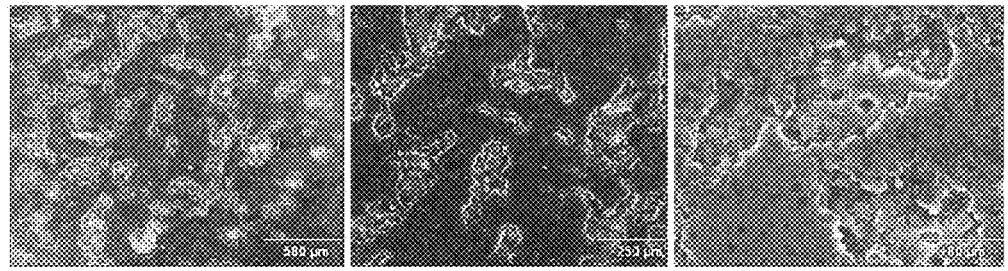
FIGS. 12A-12C are scanning electron microscope images of a cycled lithium anode active surface pretreated with a C/50 discharge rate during formation according to one set of embodiments.
Figures 13A, 13B, 13C:
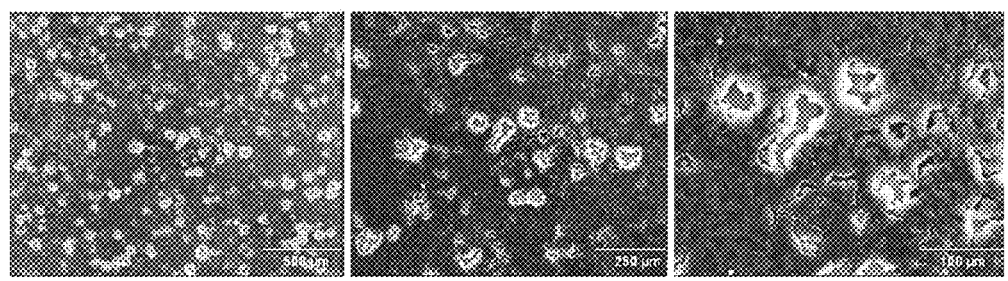
FIGS. 13A-13C are scanning electron microscope images of a cycled lithium anode active surface pretreated with a C/5 discharge rate during formation according to one set of embodiments.
Figures 14A, 14B, 14C:
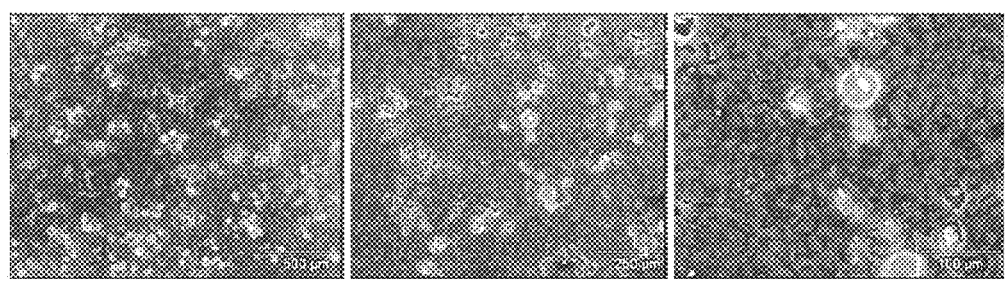
FIGS. 14A-14C are scanning electron microscope images of a cycled lithium anode active surface pretreated with a 2 C discharge rate during formation according to one set of embodiments.

The first cell was pretreated with a discharge rate of approximately C/50 and discharged to a discharge depth of approximately 83 mAh during formation. The second cell was pretreated with a discharge rate of approximately C/5 and discharged to a discharge depth of approximately 59 mAh during formation. The third cell was pretreated with a discharge rate of approximately 2 C and discharged to a discharge depth of approximately 52 mAh when the cut off voltage of 1.2 V was reached during formation. The voltage was maintained at 1.85 V for the 2 C cell until a total of approximately 60 mAh had been discharged during the overall formation process. After the pretreatment, each cell was recharged and cycled five times at a nominal C/5 rate. In FIGS. 12A-14C SEM images of the three anodes after the above noted pretreatment and cycling are presented at magnifications of 50×, 100× and 250×. FIGS. 12A-12C correspond to the cell pretreated with a C/50 rate. FIGS. 13A-13C correspond to the cell pretreated with a C/5 rate. FIGS. 14A-14C correspond to the cell pretreated with a 2 C rate. As depicted in the micrographs the number and size of the observed pitting decreases as the rate of the first discharge during formation is increased. Furthermore, this differences in the active surface are still observable after cycling. Consequently, it appears that the morphology benefits gained in the first discharge during cell formation impact the morphology of the anode during subsequent cycling thereby enabling a more homogeneous utilization of the lithium anode.

Example 5

The effect of pressure applied to the active surface combined with a fast discharge rate in the first discharge during formation also was also evaluated. Specifically, two lithium-lithium cells were tested. Each cell was subjected to a 3 C discharge rate to a 40% depth of discharge. However, one cell had no pressure applied to it during discharge cycling, see FIGS. 15A-15C, while the other had approximately a 10 kg/cm$^2$ (approximately 1 Mpa) pressure, as calculated using the active area, applied to the cell exterior during cycling discharge, see FIGS. 16A-16C. As observed in the corresponding figures, the utilization of the anode 500 in the cell without pressure applied is very relatively inhomogeneous, as indicated by the exposed copper current collector 502, FIG. 15A, and non-uniform deposition of lithium 506 is observed on the corresponding lithium cathode 504, FIG. 15B. However, application of the pressure to the other cell during discharge resulted in relatively uniform utilization of the anode, FIG. 16A and uniform deposition of material onto the corresponding cathode, FIG. 16B applied to the active surface during formation.

In addition to the above, SEM micrographs of the lithium deposited on the corresponding cathodes for the two experiments are shown in FIGS. 15C and 16C. The SEM micrographs indicate that dendritic lithium 508 is formed on the cathode when no pressure is applied while densely packed lithium 510 with no apparent dendritic lithium is deposited on the cathode when the 10 kg cm$^2$ (1 Mpa) pressure was applied.

In view of the above, it appears that the uniformity of the anode utilization is further improved when the initial high rate discharge during formation is combined with pressure. Furthermore, the morphology of deposited lithium is more densely packed and dendrite formation is suppressed when pressure is combined with high rate discharge during cell formation.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A method comprising:
providing an anode comprising:
a first electroactive layer comprising an active electrode species, the first electroactive layer having a first capacity;
a second electroactive layer comprising the active electrode species, the second electroactive layer having a second capacity; and
an ion conductive protective layer disposed between the first and second electroactive layers;
discharging the anode to a depth of discharge corresponding to at least the second capacity, thereby substantially removing the active electrode species from the second electroactive layer during the first discharge; and
depositing at least a portion of the active electrode species in the first electroactive layer through the ion conductive layer during at least one charge.

2. A method as in claim 1, wherein discharging the anode comprises discharging the anode with a plurality of discharge pulses with discharge currents greater than approximately a 3C discharge rate.

3. The method of claim 1, wherein discharging the anode comprises discharging the anode with a constant current greater than approximately a 3C discharge rate.

4. The method of claim 1, comprising discharging the anode with a discharge current greater than approximately a 6C discharge rate.

5. The method of claim 4, wherein the discharge current is less than approximately a 10C discharge rate.

6. The method of claim 1, wherein the anode is a lithium metal anode.

7. The method of claim 1, comprising discharging the anode with a discharge current greater than approximately 2.5 milliamps per square centimeter.

8. The method of claim 1, comprising discharging the anode with a discharge current greater than approximately 6 milliamps per square centimeter.

9. The method of claim 1, comprising discharging the anode to a depth of discharge greater than approximately 5% and less than approximately 75%.

10. The method of claim 1, comprising discharging the anode to a depth of discharge greater than approximately 20% and less than approximately 50%.

11. The method of claim 1, comprising discharging the anode with a plurality of discharge pulses having a pulse width greater than approximately 5 milliseconds and less than approximately 100 milliseconds.

12. The method of claim 2, comprising discharging the anode by applying at least one of a reverse pulse and a rest between each discharge pulse.

13. The method of claim 12, wherein the rest between each discharge pulse is greater than approximately 0.1 and less than approximately 10 times the duration of each discharge pulse.

14. The method of claim 1, comprising applying a force to the anode substantially normal to an active surface of the anode.

15. The method of claim 1, wherein the anode comprises an electroactive layer with disrupted crystallite formation.

16. The method of claim 15, wherein the electroactive layer with disrupted crystallite formation comprises an alloy of an electroactive material with at least one of aluminum, antimony, arsenic, magnesium, potassium, silicon, silver, sodium, and tin.

17. The method of claim 15, wherein the electroactive layer with disrupted crystallite formation comprises ceramic particles distributed throughout the electroactive layer.

18. The method of claim 17, wherein the ceramic particles comprise at least one of lithium nitride, lithium silicate, lithium borate, lithium aluminate, lithium phosphate, lithium phosphorus oxynitride, lithium silicosulfide, lithium germanosulfide, lithium oxides, lithium lanthanum oxides, lithium titanium oxides, lithium borosulfide, lithium aluminosulfide, and lithium phosphosulfide.

19. The method of claim 1, comprising discharging the anode with a plurality of discharge pulses, wherein the plurality of discharge pulses are substantially constant current discharge pulses.

20. The method of claim 12, wherein a magnitude of a current of the reverse pulse is approximately equal to at least one of the discharge currents of the discharge pulses.

21. The method of claim 1, wherein the first and/or second electroactive layer comprises lithium and silicon.

22. The method of claim 1, wherein the ion conductive protective layer comprises one or more of lithium nitride, lithium silicate, lithium borate, lithium aluminate, lithium phosphate, lithium phosphorus oxynitride, lithium silicosulfide, lithium germanosulfide, lithium oxides, lithium lanthanum oxides, lithium titanium oxides, lithium borosulfide, lithium aluminosulfide, and lithium phosphosulfide.

23. The method of claim 6, wherein the anode is part of an electrochemical cell that comprises an intercalation cathode.

24. The method of claim 1, wherein the ion conductive protective layer is an ion conducting polymer layer.

* * * * *

UNITED STATES PATENT AND TRADEMARK OFFICE
CERTIFICATE OF CORRECTION

PATENT NO.        : 9,005,311 B2
APPLICATION NO.   : 14/069698
DATED             : April 14, 2015
INVENTOR(S)       : Marina Safont-Sempere et al.

It is certified that error appears in the above-identified patent and that said Letters Patent is hereby corrected as shown below:

**In the Specification:

At column 10, lines 34-56 please replace the paragraph to remove the space between the numbers and the letter "C" as follows:

In one embodiment, the discharge rate profiles may be greater than or equal to approximately a "2 C" --2C-- discharge rate, a "2.5 C" --2.5C-- discharge rate, a "3 C" --3C-- discharge rate, a "3.5 C" --3.5C-- discharge rate, a "4 C" --4C-- discharge rate, a "4.5 C" --4.5C-- discharge rate, a "5 C" --5C-- discharge rate, a "5.5 C" --5.5C-- discharge rate, a "6 C" --6C-- discharge rate, a "6.5 C" --6.5C-- discharge rate, a "7 C" --7C-- discharge rate, a "7.5 C" --7.5C-- discharge rate, an "8 C" --8C-- discharge rate, an "8.5 C" --8.5C-- discharge rate, a "9 C" --9C-- discharge rate, a "9.5 C" --9.5C-- discharge rate, a "10 C" --10C-- discharge rate, a "15 C" --15C-- discharge rate, a "20 C" --20C-- discharge rate, or a "25 C" --25C-- discharge rate. The discharge rates may also be less than or equal to approximately a "30 C" --30C-- discharge rate, a "25 C" --25C-- discharge rate, a "20 C" --20C-- discharge rate, a "15 C" --15C-- discharge rate, a "10 C" --10C-- discharge rate, a "9 C" --9C-- discharge rate, an "8 C" --8C-- discharge rate, a "7 C" --7C-- discharge rate, a "6 C" --6C-- discharge rate, a "5.5 C" --5.5C-- discharge rate, a "5 C" --5C-- discharge rate, a "4.5 C" --4.5C-- discharge rate, or a "4 C" --4C-- discharge rate. Combinations of the above noted ranges are also possible (e.g., a discharge rate of greater than or equal to approximately a "3 C" --3C-- discharge rate and less than or equal to approximately a "10 C" --10C-- discharge rate). Other ranges are also possible. As known within the art, a "1 C" --1C-- rate corresponds to charging/discharging of a cell within one hour. Similarly, a "2 C" --2C-- rate corresponds to charging/discharging of a cell within a half-hour.

At column 10, line 57 - column 11, line 4 please replace the paragraph to remove the space between the numbers and the letter "C" as follows:

In one specific example, a lithium metal based electrode may be discharged at a rate greater than or equal to approximately 2.5 mA cm-2 "(3 C)" --(3C)--, 3 mA cm-2 "(3.6 C)" --(3.6C)--, 3.5 mA cm-2 "(4.2 C)" --(4.2C)--, 4 mA cm-2 "(4.8 C)" --(4.8C)--, 4.5 mA cm-2 "(5.4 C)" --(5.4C)--, 5 mA cm-2 "(6 C)" --(6C)--, 5.5 mA cm-2 "(6.6 C)" --(6.6C)--, or 6 mA cm-2 "(7.2 C)" --(7.2C)--. In such an embodiment, the lithium metal based electrode may also be discharged at a rate of less than or Signed and Sealed this
Sixth Day of October, 2015

Michelle K. Lee
*Director of the United States Patent and Trademark Office* equal to approximately 12 mA cm-2 "(14.4 C)" --(14.4C)--, 11 mA cm-2 "(13.2 C)" --(13.2C)--, 10 mA cm-2 "(12 C)" --(12C)--, 9 mA cm-2 "(10.8 C)" --(10.8C)--, 8 mA cm-2 "(9.6 C)" --(9.6C)--, 7 mA cm-2 "(8.4 C)" --(8.4C)--, 6 mA cm-2 "(7.2 C)" --(7.2C)--, 5 mA cm-2 "(6 C)" --(6C)--, or 4 mA cm-2 "(4.8 C)" --(4.8C)--. Combinations of the above noted ranges are also possible (e.g., a discharge rate of greater than or equal to approximately a 2.5 mA cm-2 discharge rate and less than or equal to approximately a 12 mA cm-2 discharge rate). Other ranges are also possible.

At column 23, lines 10-12 please replace the sentence to remove the space between the numbers and the letter "C" as follows:
The third cell was pretreated with a discharge rate of approximately "2 C" --2C-- and discharged to a discharge depth of approximately 52 mAh when the cut off voltage of 1.2 V was reached during formation.

At column 23, lines 13-15 please replace the sentence to remove the space between the numbers and the letter "C" as follows:
The voltage was maintained at 1.85 V for the "2 C" --2C-- cell until a total of approximately 60 mAh had been discharged during the overall formation process.

At column 23, lines 22-23 please replace the sentence to remove the space between the numbers and the letter "C" as follows:
Figs. 14A-14C correspond to the cell pretreated with a "2 C" --2C-- rate.

At column 23, line 38 please remove the space between the numbers and the letter "C" in the sentence as follows:
Each cell was subjected to a "3 C" --3C-- discharge rate to a 40% depth of discharge.**